(12) United States Patent
Kondo et al.

(10) Patent No.: US 7,082,220 B2
(45) Date of Patent: Jul. 25, 2006

(54) DATA PROCESSING APPARATUS

(75) Inventors: Tetsujiro Kondo, Tokyo (JP); Tsutomu Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 719 days.

(21) Appl. No.: 10/239,805

(22) PCT Filed: Jan. 24, 2002

(86) PCT No.: PCT/JP02/00490

§ 371 (c)(1),
(2), (4) Date: Feb. 3, 2003

(87) PCT Pub. No.: WO02/060069

PCT Pub. Date: Aug. 1, 2002

(65) Prior Publication Data

US 2003/0152165 A1 Aug. 14, 2003

(30) Foreign Application Priority Data

Jan. 25, 2001 (JP) .............................. 2001-16869

(51) Int. Cl.
*G06K 9/36* (2006.01)
*G06K 9/48* (2006.01)
(52) U.S. Cl. .................. 382/238; 382/232; 382/250; 348/394; 348/409; 358/426.02; 358/426.03
(58) Field of Classification Search ........ 382/238–239, 382/232–233, 244–253, 274; 341/51; 710/62; 375/316, 295, 240.12, 240.02, 240; 348/404.1–407.1, 348/409.1–419.1; 358/426.02–426.11
See application file for complete search history.

(56) References Cited

U.S. PATENT DOCUMENTS

| | | | | |
|---|---|---|---|---|
| 6,339,615 B1 * | 1/2002 | Kondo et al. | .......... | 375/240.14 |
| 6,442,207 B1 * | 8/2002 | Nishikawa et al. | ..... | 375/240.26 |
| 6,912,253 B1 * | 6/2005 | Li et al. | ................ | 375/240.12 |

(Continued)

FOREIGN PATENT DOCUMENTS

EP         0 597 724        5/1994

(Continued)

OTHER PUBLICATIONS

Patent Abstracts of Japan, vol. 1999, No. 02, Feb. 26, 1999 & JP 10 313251 A (Sony Corp), Nov. 24, 1998.

*Primary Examiner*—Jingge Wu
*Assistant Examiner*—Ali Bayat
(74) *Attorney, Agent, or Firm*—Frommer Lawrence & Haug LLP; William S. Frommer

(57) ABSTRACT

The present invention relates to data processing apparatuses which improve the quality of decoded data, such as an image and sound, more. A decoding section 21 decodes, for example, encoded data obtained by JPEG-encoding an image, and an encoding section 22 encodes first decoded data obtained as a result to output re-encoded data. Further, a decoding section 23 decodes the re-encoded data to obtain second decoded data. A class-classification adaptive processing circuit 24 generates a prediction tap used for a predetermined prediction calculation with tap coefficients obtained by learning, from the first decoded data and the second decoded data, and performs the predetermined prediction calculation by using the prediction tap and the tap coefficients to obtain a prediction value corresponding to master data used as a master in the learning. The present invention can be applied to transfer systems for encoding images and sound to transfer them.

43 Claims, 14 Drawing Sheets

FOREIGN PATENT DOCUMENTS

| | | |
|---|---|---|
| JP | 6-152432 | 5/1994 |
| JP | 8-307835 | 11/1996 |
| JP | 8-322041 | 12/1996 |
| JP | 9-186608 | 7/1997 |

* cited by examiner

DATA PROCESSING APPARATUS

TECHNICAL FIELD

The present invention relates to data processing apparatuses, and more particularly, to a data processing apparatus which allows, for example, a high-quality image and a high-quality sound to be decoded.

BACKGROUND ART

The present applicant has already proposed class classification adaptive processing as a method for improving the quality of images and that of sound.

The class classification adaptive processing is formed of class classification processing and adaptive processing. Data is classified into classes according to its nature in the class classification processing, and the adaptive processing is applied to each class. The adaptive processing is performed in the following way.

Specifically, for example, assuming now that images are to be handled, in the adaptive processing, for example, pixel values of a low-quality image are linearly coupled with predetermined tap coefficients to obtain prediction values of pixel values of a high-quality image, so that the low-quality image is converted to the high-quality image.

More specifically, for example, it is assumed now that a high-quality image is set to master data; a decoded image having a reduced image quality, obtained by encoding the high-quality image, for example, by a JPEG (Joint Photographic Experts Group) method or an MPEG (Moving Picture Experts Group) method, and then decoding encoded data, is set to apprentice data; and a prediction value $E[y]$ of a high-quality pixel value "y," serving as maser data, is obtained by a linear coupling model defined by linear coupling of a set of low-quality pixel values, $x_1, x_2, \ldots$, serving as apprentice data, and predetermined tap coefficients $w_1, w_2, \ldots$. In this case, the prediction value $E[y]$ can be expressed by the following expression.

$$E[y] = w_1 x_1 + w_2 x_2 + \ldots \quad (1)$$

To generalize expression (1), when a matrix "W" formed of a set of tap coefficients "$w_j$," a matrix "X" formed of a set of apprentice data "$x_{ij}$," and a matrix "Y'" formed of a set of prediction values $E[y_j]$ are defined in the following expressions, $$X = \begin{bmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{bmatrix}$$

$$W = \begin{bmatrix} W_1 \\ W_2 \\ \cdots \\ W_J \end{bmatrix}, Y' = \begin{bmatrix} E[y_1] \\ E[y_2] \\ \cdots \\ E[y_I] \end{bmatrix}$$

[Expression 1]

the following observation equation is satisfied.

$$XW = Y' \quad (2)$$

where, an element $x_{ij}$ in the matrix X indicates j-th apprentice data in i-th set (set of apprentice data used for predicting i-th master data $y_i$) of apprentice data, an element $w_j$ in the matrix W indicates a tap coefficient to be multiplied by the j-th apprentice data in a set of apprentice data, and $y_i$ indicates i-th master data. Therefore, $E[y_i]$ indicates a prediction value for the i-th master data. In expression (1), the suffix i in the element $y_i$ of the matrix Y is omitted to show y at the left-hand side, and the suffix i in the element $x_{ij}$ of the matrix X is also omitted to show $x_1, x_2, \ldots$ at the right-hand side.

It is assumed that the least squares method is applied to this observation equation (2) to obtain a prediction value $E[y]$ close to the high-quality pixel value "y." In this case, when a matrix "Y" formed of a set of the pixel values "y" serving as master data, and a matrix "E" formed of a set of the remainders "e" of the prediction values $E[y]$ with respect to the pixel values "y" are defined in the following way, $$E = \begin{bmatrix} e_1 \\ e_2 \\ \cdots \\ e_T \end{bmatrix}, Y = \begin{bmatrix} y_1 \\ y_2 \\ \cdots \\ y_T \end{bmatrix}$$

[Expression 2]

the following remainder equation is satisfied from expression (2).

$$XW = Y + E \quad (3)$$

In this case, tap coefficients $w_i$ used to obtain a prediction value $E[y]$ close to the original pixel value "y" are obtained when the following square error is made minimum.

$$\sum_{i=1}^{I} e_i^2$$

[Expression 3]

Therefore, when the result obtained by differentiating the above square error by the prediction coefficients $w_j$ is zero, in other words, the prediction coefficients $w_j$ which satisfy the following expression are the most appropriate values for obtaining a prediction value $E[y]$ close to the pixel value "y."

[Expression 4]

$$e_1 \frac{\partial e_1}{\partial w_j} + e_2 \frac{\partial e_2}{\partial w_j} + \cdots + e_I \frac{\partial e_I}{\partial w_j} = 0 \, (j = 1, 2, \cdots, J) \quad (4)$$

When expression (3) is differentiated by the prediction coefficients $w_j$, the following expression is satisfied.

[Expression 5]

$$\frac{\partial e_i}{\partial w_1} = x_{i1}, \frac{\partial e_i}{\partial w_2} = x_{i2}, \cdots, \frac{\partial e_i}{\partial w_J} = x_{iJ}, (i = 1, 2, \cdots, I) \quad (5)$$

From expressions (4) and (5), expression (6) is obtained.

[Expression 6]

$$\sum_{i=1}^{I} e_i x_{i1} = 0, \sum_{i=1}^{I} e_i x_{i2} = 0, \cdots \sum_{i=1}^{I} e_i x_{iJ} = 0. \quad (6)$$

In addition, when the relationships among the apprentice data "$x_{ij}$," the tap coefficients "$w_j$," the master data "$y_i$," and the remainders "$e_i$," in the remainder equation (3) are taken into account, the following normal equations are obtained from expression (6).

[Expression 7]

$$\begin{cases} \left(\sum_{i=1}^{I} x_{i1}x_{i1}\right)W_1 + \left(\sum_{i=1}^{I} x_{i1}x_{i2}\right)W_2 + \cdots + \left(\sum_{i=1}^{I} x_{i1}x_{iJ}\right)W_J = \left(\sum_{i=1}^{I} x_{i1}y_i\right) \\ \left(\sum_{i=1}^{I} x_{i2}x_{i1}\right)W_1 + \left(\sum_{i=1}^{I} x_{i2}x_{i2}\right)W_2 + \cdots + \left(\sum_{i=1}^{I} x_{i2}x_{iJ}\right)W_J = \left(\sum_{i=1}^{I} x_{i2}y_i\right) \\ \left(\sum_{i=1}^{I} x_{iJ}x_{i1}\right)W_1 + \left(\sum_{i=1}^{I} x_{iJ}x_{i2}\right)W_2 + \cdots + \left(\sum_{i=1}^{I} x_{iJ}x_{iJ}\right)W_J = \left(\sum_{i=1}^{I} x_{iJ}y_i\right) \end{cases} \quad (7)$$

When a matrix (covariance matrix) A and a vector "v" are defined in the following way,

[Expression 8]

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix}$$

$$v = \begin{pmatrix} \sum_{i=1}^{I} x_{i1}y_i \\ \sum_{i=1}^{I} x_{i2}y_i \\ \vdots \\ \sum_{i=1}^{I} x_{iJ}y_i \end{pmatrix}$$

and the vector W is defined as shown in expression (1), the normal equations shown in (7) can be expressed in the following way.

$$AW = v \quad (8)$$

The same number of normal equations (7) as that "J" of the tap coefficients "$w_j$" to be obtained can be formulated if a certain number of sets of apprentice data $x_{ij}$ and master data $y_i$ are prepared. Therefore, by solving equation (8) for the vector W (to solve equation (8), the matrix A in equation (8) needs to be a non-singular matrix), the tap coefficients "$w_j$" which make a statistical prediction error minimum (in this case, which make the square error minimum) is obtained. It is possible to use, for example, a sweep off method (Gauss-Jordan deletion method) to solve equation (8).

As described above, in the adaptive processing, the tap coefficients $w_j$ which make the statistical prediction error minimum are obtained, and then, a prediction value E[y] close to the high-quality pixel value "y" is obtained from expression (1) by the use of the tap coefficients $w_j$.

When an image having the same image quality as the image to be encoded is used as master data, and a decoded image obtained by first encoding the master data and then decoding it is used as apprentice data, for example, tap coefficients which make the statistical prediction error minimum in a process of decoding the encoded image data to generate the original image data are obtained.

When an image having a higher resolution than the image to be encoded is used as master data, and a decoded image obtained by reducing the resolution of the master data to the same image quality as the image to be encoded, encoding it, and then decoding it is used as apprentice data, for example, tap coefficients which make the statistical prediction error minimum in a process of decoding the encoded image data to generate the high-resolution image data are obtained.

Therefore, in this case, according to the adaptive processing, depending on selecting an image used for master data or apprentice data, tap coefficients are obtained which can adjust the image quality of a decoded image as desired.

The adaptive processing largely differs from usual filtering implemented by a filter in that tap coefficients which make the statistical prediction error minimum by learning are used, and a high-frequency component not included in the image to be encoded is reproduced.

Therefore, when class classification adaptive processing is applied to a decoded image obtained by decoding encoded data, the decoded image has an improved image quality.

If the image quality of a decoded image obtained by decoding encoded data is very low due to, for example, the state of a transmission path through which the encoded data is transmitted, and a compression rate at which image data was encoded, however, even when class classification adaptive processing is executed only by the use of the decoded image, it is difficult to sufficiently improve its image quality in some cases.

DISCLOSURE OF INVENTION

The present invention has been made in consideration of the above situation. An object of the present invention is to allow data having a sufficiently improved quality to be obtained.

A first data processing apparatus according to the present invention is characterized by including decoding means for decoding encoded data and for outputting decoded data; re-encoding means for encoding the decoded data and for outputting re-encoded data; prediction-tap generation means for generating a prediction tap used for a predetermined prediction calculation with tap coefficients obtained by learning, from the decoded data and information obtained from the re-encoded data; and prediction means for obtaining a prediction value corresponding to master data used as a master in the learning, by the predetermined prediction calculation with the use of the prediction tap and the tap coefficients.

A first data processing method according to the present invention is characterized by including a decoding step of decoding encoded data and of outputting decoded data; a re-encoding step of encoding the decoded data and of outputting re-encoded data; a prediction-tap generation step of generating a prediction tap used for a predetermined prediction calculation with tap coefficients obtained by learning, from the decoded data and information obtained from the re-encoded data; and a prediction step of obtaining a prediction value corresponding to master data used as a master in the learning, by the predetermined prediction calculation with the use of the prediction tap and the tap coefficients.

A first program according to the present invention is characterized by including a decoding step of decoding encoded data and of outputting decoded data; a re-encoding step of encoding the decoded data and of outputting re-encoded data; a prediction-tap generation step of generating a prediction tap used for a predetermined prediction calculation with tap coefficients obtained by learning, from the decoded data and information obtained from the re-encoded data; and a prediction step of obtaining a prediction value corresponding to master data used as a master in the learning, by the predetermined prediction calculation with the use of the prediction tap and the tap coefficients.

A first recording medium according to the present invention is characterized by recording a program, the program including a decoding step of decoding encoded data and of outputting decoded data; a re-encoding step of encoding the decoded data and of outputting re-encoded data; a prediction-tap generation step of generating a prediction tap used for a predetermined prediction calculation with tap coefficients obtained by learning, from the decoded data and information obtained from the re-encoded data; and a prediction step of obtaining a prediction value corresponding to master data used as a master in the learning, by the predetermined prediction calculation with the use of the prediction tap and the tap coefficients.

A second data processing apparatus according to the present invention is characterized by including apprentice-data generation means for generating from master data serving as a master, decoded data obtained by encoding the master data and then decoding it, and information obtained from re-encoded data obtained by encoding the decoded data, as apprentice data serving as an apprentice; prediction-tap generation means for generating a prediction tap used for predicting the master data, from the apprentice data; and learning means for performing learning such that the prediction error of a prediction value for the master data, obtained by performing a predetermined prediction calculation by using the prediction tap and tap coefficients, is statistically minimum, and for obtaining the tap coefficients.

A second data processing method according to the present invention characterized by including an apprentice-data generation step of generating from master data serving as a master, decoded data obtained by encoding the master data and then decoding it, and information obtained from re-encoded data obtained by encoding the decoded data, as apprentice data serving as an apprentice; a prediction-tap generation step of generating a prediction tap used for predicting the master data, from the apprentice data; and a learning step of performing learning such that the prediction error of a prediction value for the master data, obtained by a predetermined prediction calculation by using the prediction tap and tap coefficients, is statistically minimum, and of obtaining the tap coefficients.

A second program according to the present invention is characterized by including an apprentice-data generation step of generating from master data serving as a master, decoded data obtained by encoding the master data and then decoding it, and information obtained from re-encoded data obtained by encoding the decoded data, as apprentice data serving as an apprentice; a prediction-tap generation step of generating a prediction tap used for predicting the master data, from the apprentice data; and a learning step of performing learning such that the prediction error of a prediction value for the master data, obtained by a predetermined prediction calculation by using the prediction tap and tap coefficients, is statistically minimum, and of obtaining the tap coefficients.

A second recording medium is characterized by recording a program, the program including an apprentice-data generation step of generating from master data serving as a master, decoded data obtained by encoding the master data and then decoding it, and information obtained from re-encoded data obtained by encoding the decoded data, as apprentice data serving as an apprentice; a prediction-tap generation step of generating a prediction tap used for predicting the master data, from the apprentice data; and a learning step of performing learning such that the prediction error of a prediction value for the master data, obtained by a predetermined prediction calculation by using the prediction tap and tap coefficients, is statistically minimum, and of obtaining the tap coefficients.

A third data processing apparatus according to the present invention is characterized by including decoding means for decoding encoded data obtained by encoding data and for outputting decoded data; re-encoding means for encoding the decoded data and for outputting re-encoded data; class-tap generation means for generating a class tap used for the class classification, from the decoded data and information obtained from the re-encoded data; and class classification means for performing class classification according to the class tap.

A third data processing method according to the present invention is characterized by including a decoding step of decoding encoded data obtained by encoding data and for outputting decoded data; a re-encoding step of encoding the decoded data and for outputting re-encoded data; a class-tap generation step of generating a class tap used for the class classification, from the decoded data and information obtained from the re-encoded data; and a class classification step of performing class classification according to the class tap.

A third program according to the present invention is characterized by including a decoding step of decoding encoded data obtained by encoding data and for outputting decoded data; a re-encoding step of encoding the decoded data and for outputting re-encoded data; a class-tap generation step of generating a class tap used for the class classification, from the decoded data and information obtained from the re-encoded data; and a class classification step of performing class classification according to the class tap.

A third recording medium according to the present invention is characterized by recording a program, the program including a decoding step of decoding encoded data obtained by encoding data and for outputting decoded data; a re-encoding step of encoding the decoded data and for outputting re-encoded data; a class-tap generation step of generating a class tap used for the class classification, from the decoded data and information obtained from the re-encoded data; and a class classification step of performing class classification according to the class tap.

In the first data processing apparatus, the first data processing method, the first program, and the first recording medium according to the present invention, encoded data is decoded, and decoded data obtained as a result is encoded to output re-encoded data. A prediction tap used for a predetermined prediction calculation with tap coefficients obtained by learning is generated from the decoded data and information obtained from the re-encoded data. The prediction tap and the tap coefficients are used to perform the predetermined prediction calculation to obtain a prediction value corresponding to master data used as a master in the learning.

In the second data processing apparatus, the second data processing method, the second program, and the second recording medium according to the present invention, decoded data obtained by encoding master data and decoding it, and information obtained from re-encoded data obtained by encoding the decoded data are generated from the master data serving as a master, as apprentice data serving as an apprentice. Then, a prediction tap used for predicting the master data is generated from the apprentice data, and learning is performed such that the prediction error of a prediction value for the master data, obtained by performing a predetermined prediction calculation by using the prediction tap and tap coefficients to obtain the tap coefficients.

In the third data processing apparatus, the third data processing method, the third program, and the third recording medium according to the present invention, encoded data obtained by encoding data is decoded, and decoded data obtained as a result is encoded to output re-encoded data. Then, a class tap used for class classification is generated from the decoded data and information obtained from the re-encoded data. Class classification is performed according to the class tap.

BEST MODE FOR CARRYING OUT THE INVENTION

Figure 1:
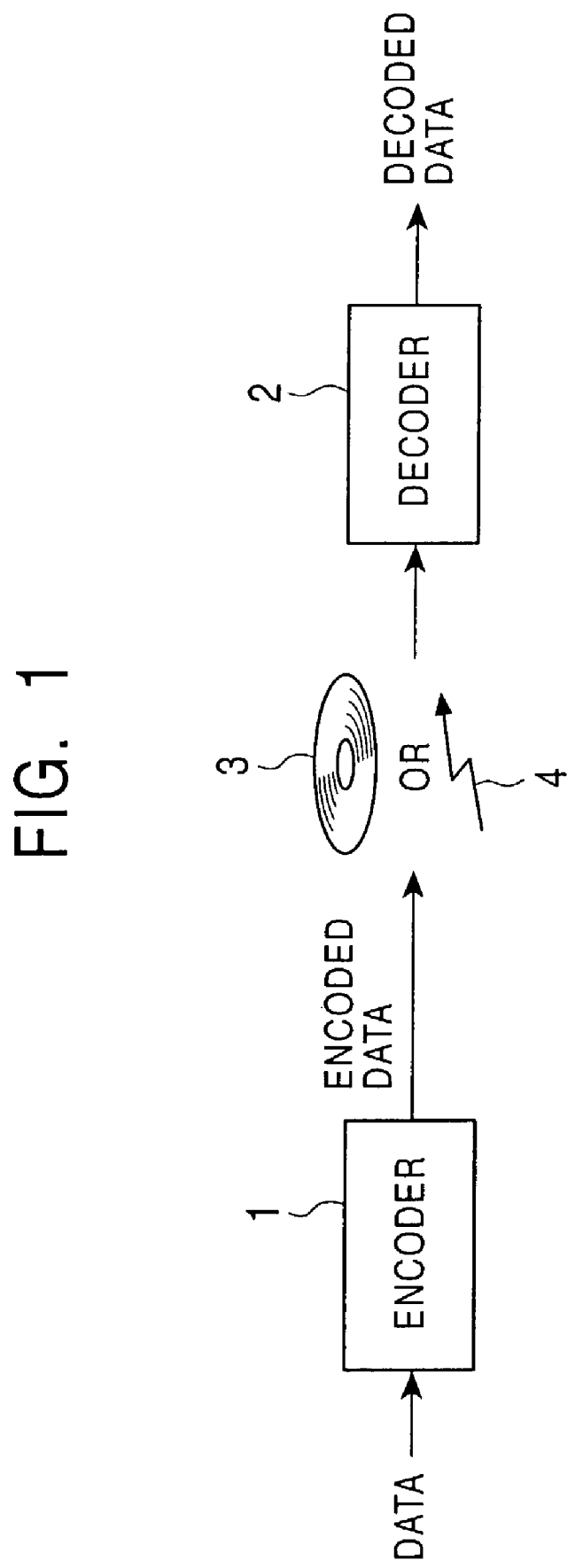
FIG. 1 is a view showing an example structure of a data transfer system according to an embodiment of the present invention.

FIG. 1 shows an example structure of a data transfer system according to an embodiment of the present invention.

Data to be transferred is input to an encoder 1. The encoder 1 encodes the input data according to, for example, a predetermined encoding method to generate encoded data. The encoded data is recorded into a recording medium 3, such as a semiconductor memory, a magneto-optical disk, a magnetic disk, an optical disk, a magnetic tape, or a phase-change disk, or is transferred through a transfer medium 4, such as a terrestrial wave, a satellite line, a CATV (cable television) network, the Internet, or a public line.

A decoder 2 receives and decodes the encoded data sent through the recording medium 3 or a transfer medium 4, and outputs decoded data obtained as a result. When the decoded data is image data, for example, the image data is, for example, sent to and displayed on a display not shown. When the encoded data is audio data, for example, the audio data is, for example, sent to and output from a speaker not shown.

Figure 2:
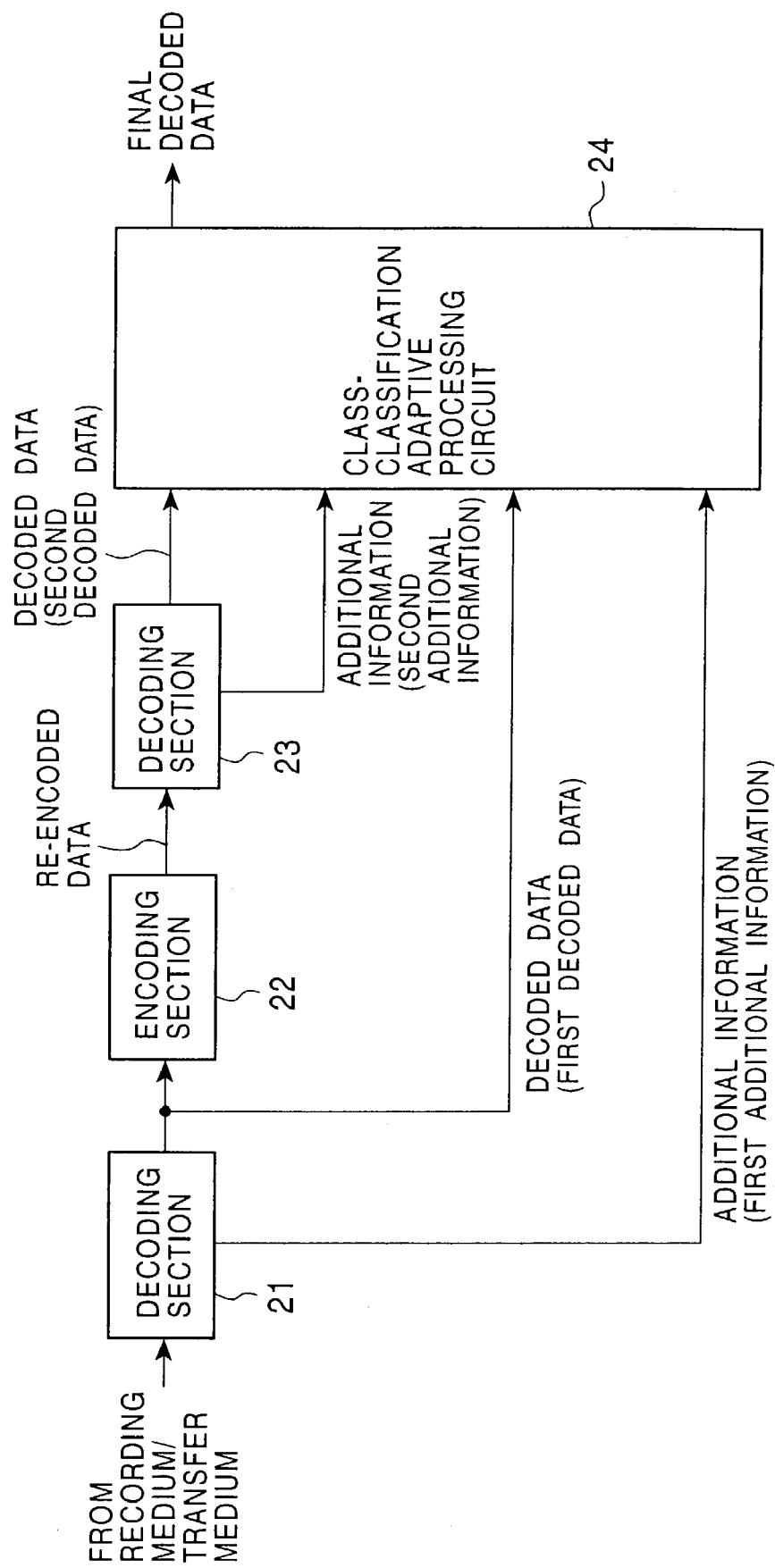
FIG. 2 is a block diagram showing an example structure of a decoder 2.

Next, FIG. 2 shows an example structure of the decoder 2 shown in FIG. 1.

The encoded data is sent to a decoding section 21. The decoding section 21 decodes the encoded data according to, for example, a decoding method corresponding to the encoding method used in the encoder 1, and sends decoded data obtained as a result to an encoding section 22 and to a class-classification adaptive processing circuit 24. The decoding section 21 also sends information obtained in a process of decoding the encoded data to the class-classification adaptive processing circuit 24 as additional information.

The encoding section 22 encodes (re-encodes) the decoded data sent from the decoding section 21 according to, for example, the same encoding method as that used in the encoder 1 shown in FIG. 1 to generate re-encoded data. The re-encoded data is sent from the encoding section 22 to a decoding section 23.

The decoding section 23 decodes the re-encoded data sent from the encoding section 22 and sends decoded data obtained as a result to the class-classification adaptive processing circuit 24, for example, in the same way as in the decoding section 21. The decoding section 23 also sends information obtained in a process of decoding the re-encoded data to the class-classification adaptive processing circuit 24 as additional information.

Hereinafter, if necessary, the decoded data output from the decoding section 21 which performs first decoding is called first decoded data, and the decoded data output from the decoding section 23 which performs second decoding is called second decoded data. In the same way, hereinafter, if necessary, the additional information output from the decoding section 21 which performs the first decoding is called first additional information, and the additional information output from the decoding section 23 which performs the second decoding is called second additional information. Further, hereinafter, if necessary, the first decoded data and the second decoded data are collectively called just decoded data. In the same way, hereinafter, if necessary, the first additional information and the second additional information are collectively called just additional information.

The class-classification adaptive processing circuit 24 uses the first decoded data and the first additional information sent from the decoding section 21 and further the second decoded data and the second additional information sent from the decoding section 23 to perform class-classification adaptive processing, and outputs decoded data (hereinafter, if necessary called final decoded data) serving as a final decoding result of the encoded data.

Therefore, since the class-classification adaptive processing circuit 24 uses the first decoded data obtained by decoding the encoded data, the first additional information obtained in that decoding process, the second decoded data obtained by re-encoding the first decoded data and then decoding the re-encoded data, and the second additional information obtained in the process of decoding the re-encoded data to perform class-classification adaptive processing, even if the first decoded data has largely reduced quality, it is possible to obtain the final decoded data having a sufficiently improved quality.

One or more sets similar to the set of the encoding section 22 and the decoding section 23 can be provided in a subsequent stage of the decoding section 23. In this case, it is possible that third decoded data obtained by encoding the second decoded data and then decoding encoded data obtained as a result, and third additional information obtained in that decoding process are sent to the class-classification adaptive processing circuit 24 to perform class-classification adaptive processing.

Figure 3:
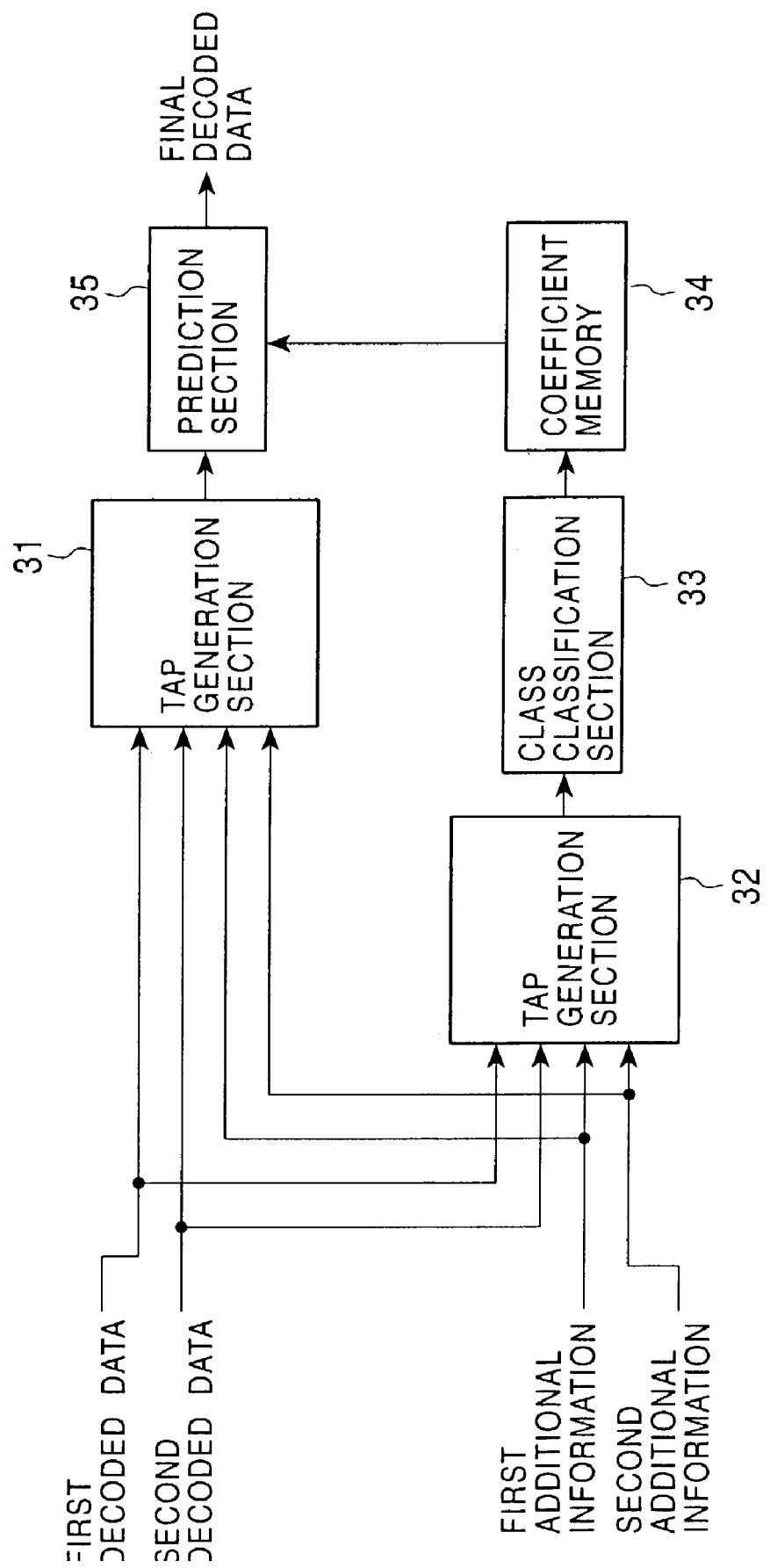
FIG. 3 is a block diagram showing an example structure of a class-classification adaptive processing circuit 24.

FIG. 3 shows an example structure of the class-classification adaptive processing circuit 24 shown in FIG. 2.

The first decoded data, the first additional information, the second decoded data, and the second additional information are input to tap generation sections 31 and 32.

The tap generation section 31 generates a prediction tap used for a prediction calculation executed in a prediction section 35, described later, from the first decoded data, the first additional information, the second decoded data, and the second additional information. More specifically, the tap generation section 31 extracts, for example, first decoded data and second decoded data that are closer in time or in space aimed-at data which is aimed at because it is to be improved in quality, also extracts first additional information and second additional information used for decoding that first decoded data and that second decoded data, and then, sends extracted data (information) to the prediction section 35 as a prediction tap.

The tap generation section 32 generates a class tap used for class classification executed in a class classification section 33, described later, from the first decoded data, the first additional information, the second decoded data, and the second additional information. More specifically, the tap generation section 32 generates, for example, a class tap having the same structure as the prediction tap generated by the tap generation section 31 for the aimed-at data, and sends it to the class classification section 35.

To make a description simple, it is specified here that the class tap have the same structure as the prediction tap. It is possible that the class tap and the prediction tap have different structures, more specifically, they are generated by extracting different data items from the first decoded data, the first additional information, the second decoded data, and the second additional information.

The class classification section 33 performs class classification for the aimed-at data according to the class tap sent from the tap generation section 32, and outputs a class code corresponding to a class obtained as a result to a coefficient memory 34.

The coefficient memory 34 stores tap coefficients for each class, obtained by learning processing executed in a learning apparatus shown in FIG. 6, described later, and outputs the tap coefficients stored at the address corresponding to the class code output from the class classification section 33, to the prediction section 35.

The prediction section 35 obtains the prediction tap output from the tap generation section 31 and the tap coefficients output from the coefficient memory 34, uses the prediction tap and the tap coefficients to perform a linear prediction calculation (sum-of-products calculation) indicated by expression (1), and obtains and outputs data acquired by improving the quality of the aimed-at data, that is, a prediction value of the aimed-at data having higher quality.

Next, FIG. 4 shows an example structure of the class classification section 33 shown in FIG. 3.

Figure 4A:
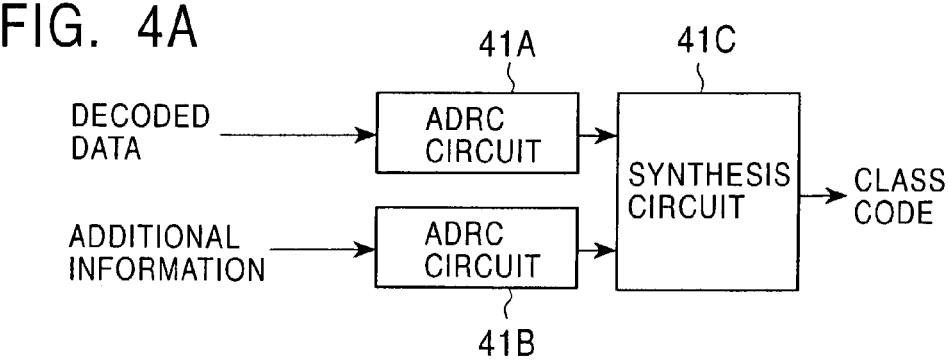
FIG. 4A to FIG. 4D are block diagrams showing example structures of class classification sections 33 and 59.

The class classification section 33 can be formed, for example, of ADRC (adaptive dynamic range coding) circuits 41A and 41B, and a synthesis circuit 41C, as shown in FIG. 4A.

In this case, the ADRC circuits 41A and 41B apply K-bit ADRC processing to decoded data and additional information which constitute the class tap, and output ADRC codes obtained as results to the synthesis circuit 41C.

In the K-bit ADRC processing, for example, the maximum value MAX and the minimum value MIN of the information constituting the class tap are detected, the difference DR=MAX−MIN therebetween is set to a local dynamic range of a set, and the information constituting the class tap is re-quantized to K bits according to this dynamic range DR. IN other words, the minimum value MIN is subtracted from each information constituting the class tap, and the remainder is divided (quantized) by $DR/2^K$. A bit string in which the K-bit values, obtained as described above, of the information constituting the class tap are arranged in a predetermined order is output as an ADRC code.

The synthesis circuit 41C synthesizes the ADRC code of the decoded data, output from the ADRC circuit 41A and the ADRC code of the additional information, output from the ADRC circuit 41G into one code and outputs it as a class code.

As described later, additional information constituting a class tap is not limited to one type. When there are a plurality of additional information, the ADRC circuit 41B applies the ADRC processing to each of the plurality of additional information, and outputs a plurality of ADRC codes. Then, the synthesis circuit 41C generates one code from the plurality of ADRC codes. This can also be applied to the class classification section 33 shown in each of FIG. 4B to FIG. 4D, described later.

Next, the class classification section 33 can also be formed, for example, of calculators 42A and 42B, and the ADRC circuits 41A and 41B and the synthesis circuit 41C shown in FIG. 4A.

More specifically, in this case, the calculator 42A calculates the difference between the first decoded data constituting the class tap and the second decoded data corresponding to the first decoded data, and sends the difference to the ADRC circuit 41A. The calculator 42B calculates the difference between the first additional information constituting the class tap and the second additional information corresponding to the first additional information, and sends the difference to the ADRC circuit 41B.

The second decoded data corresponding to the first decoded data means, when the decoded data is an image, for example, the same decoded pixel obtained as the second decoded data as the decoded pixel obtained as the first decoded data. In other words, when decoded pixels serving as first decoded data and second decoded data at a position (x, y) in a frame f are called p1(f, x, y) and p2(f, x, y), the second decoded data corresponding to the first decoded data p1(f, x, y) is p2(f, x, y).

The second additional information corresponding to the first additional information means, when the decoded data is audio data decoded by a CELP (code excited linear prediction coding) method, described later, and the additional information is linear prediction coefficients obtained in that decoding process, the linear prediction coefficients obtained as the second additional information, having the same order as the linear prediction coefficients obtained as the first additional information. In other words, when the p-th order linear prediction coefficients used for audio decoding, serving as first decoded data and second decoded data in a frame (or sub-frame) f are called $\alpha1(f, p)$ and $\alpha2(f, p)$, the second additional information corresponding to the first additional information $\alpha1(f, p)$ is $\alpha2(f, p)$. Further, when the decoded data is image data decoded by a JPEG method, described later, and the additional information is DCT coefficients obtained in that decoding process, for example, the second additional information corresponding to the first additional information means the DCT coefficients obtained as the second additional information, having the same spatial frequency as the DCT coefficients obtained as the first additional information. In other words, when DCT coefficients serving as first additional information and second additional information at a position (x, y) in a eight-by-eight block b on a frame f are called $d1(f, b, x, y)$ and $d2(f, b, x, y)$, the second additional information corresponding to the first additional information $d1(f, b, x, y)$ is $d2(f, b, x, y)$.

The same processing as in the case shown in FIG. 4A is applied to the difference between the first decoded data and the second decoded data and to the difference between the first additional information and the second additional information to obtain a class code.

Figure 4B:
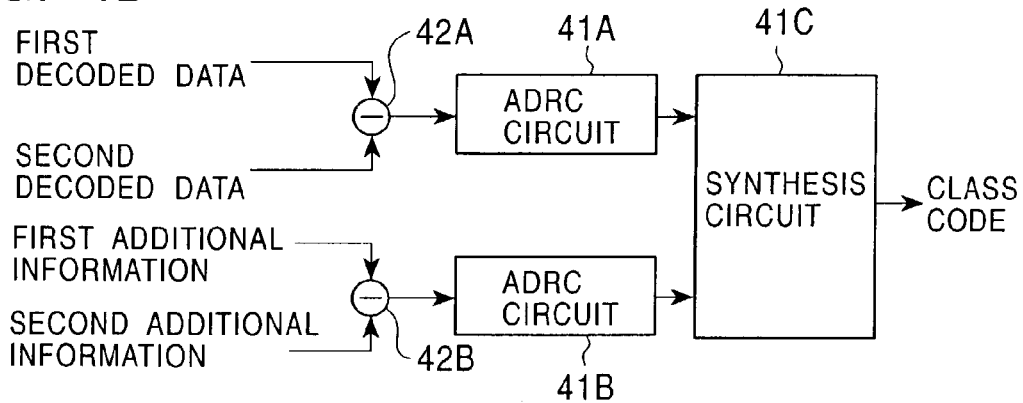
Figure 4C:
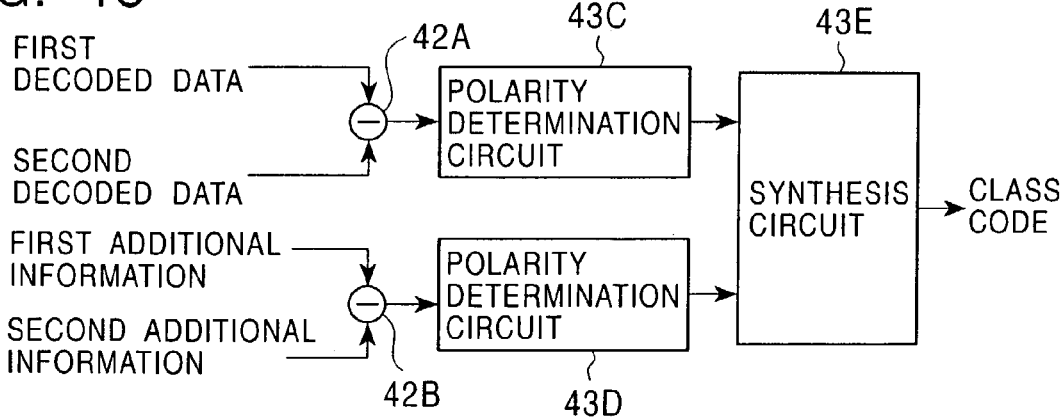

Further, the class classification circuit 33 can also be configured, for example, as shown in FIG. 4C.

Also in this case, in the same way as in the case shown in FIG. 4B, the calculator 42A calculates the difference between the first decoded data and the second decoded data, and the calculator 42B calculates the difference between the first additional information and the second additional information.

The difference between the first decoded data and the second decoded data is sent from the calculator 42A to a polarity determination circuit 43C. The polarity determination circuit 43C determines the polarity (sign) of the difference between the first decoded data and the second decoded data, and outputs "0" or "1" according to the polarity to a synthesis circuit 43E.

The difference between the first additional information and the second additional information is sent from the calculator 42B to a polarity determination circuit 43D. The polarity determination circuit 43D determines the polarity of the difference between the first additional information and the second additional information, and also outputs "0" or "1" according to the polarity to the synthesis circuit 43E.

The synthesis circuit 43E synthesizes series of "0" or "1" corresponding to the polarities, sent from the polarity determination circuits 43C and 44C into one code and outputs it as a class code.

Figure 4D:
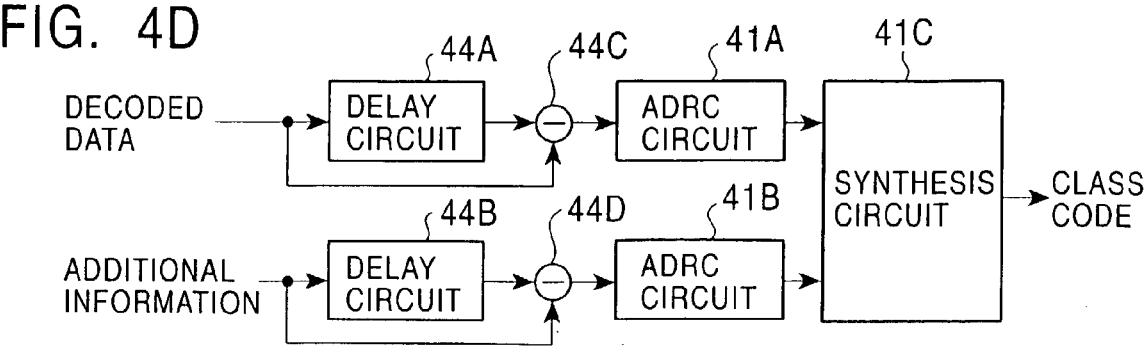

Further, the class classification section 33 can also be formed, as shown in FIG. 4D, of delay circuits 44A and 44B and calculators 44C and 44D, and the ADRC circuits 41A and 41B and the synthesis circuit 41C shown in FIG. 4A.

In this case, the delay circuit 44A delays the decoded data constituting the class tap, for example, for the period corresponding to one sample (one class tap), and sends it to the calculator 44C. The calculator 44C calculates the difference between the decoded data constituting the class tap and the delayed decoded data output from the delay circuit 44A, and sends the difference to the ADRC circuit 41A.

The delay circuit 44B delays the additional information constituting the class tap, for example, for the period corresponding to one sample (one class tap), and sends it to the calculator 44D. The calculator 44D calculates the difference between the additional information constituting the class tap and the delayed additional information output from the delay circuit 44B, and sends the difference to the ADRC circuit 41B.

Then, the ADRC circuits 41A and 41B and the synthesis circuit 41C apply the same processing as in the case shown in FIG. 4A to the above-described differences to output a class code.

In addition, the class classification section 33 can also be formed, for example, of a circuit for synthesizing any two or more outputs of the circuits shown in FIG. 4A to FIG. 4D into one code and for outputting it.

Further, the class classification section 33 can also be formed of a circuit other than the circuits shown in FIG. 4. More specifically, when DCT (discrete cosine transform) coefficients, one type of orthogonal conversion coefficients, are obtained in a process of decoding encoded data, such as JPEG-encoded data or MPEG-encoded data, and additional information constituting a class tap includes such DCT coefficients, for example, the class classification section 33 can be configured such that it outputs a class code based on the activity of an image obtained from DCT coefficients in a eight-by-eight block, or such that it outputs a class code based on the position of an aimed-at pixel in a block. Further, the class classification section 33 can also be configured, for example, such that it outputs the result obtained when vector quantization is applied to the decoded data or the additional information constituting the class tap, as a class code.

Figure 5:
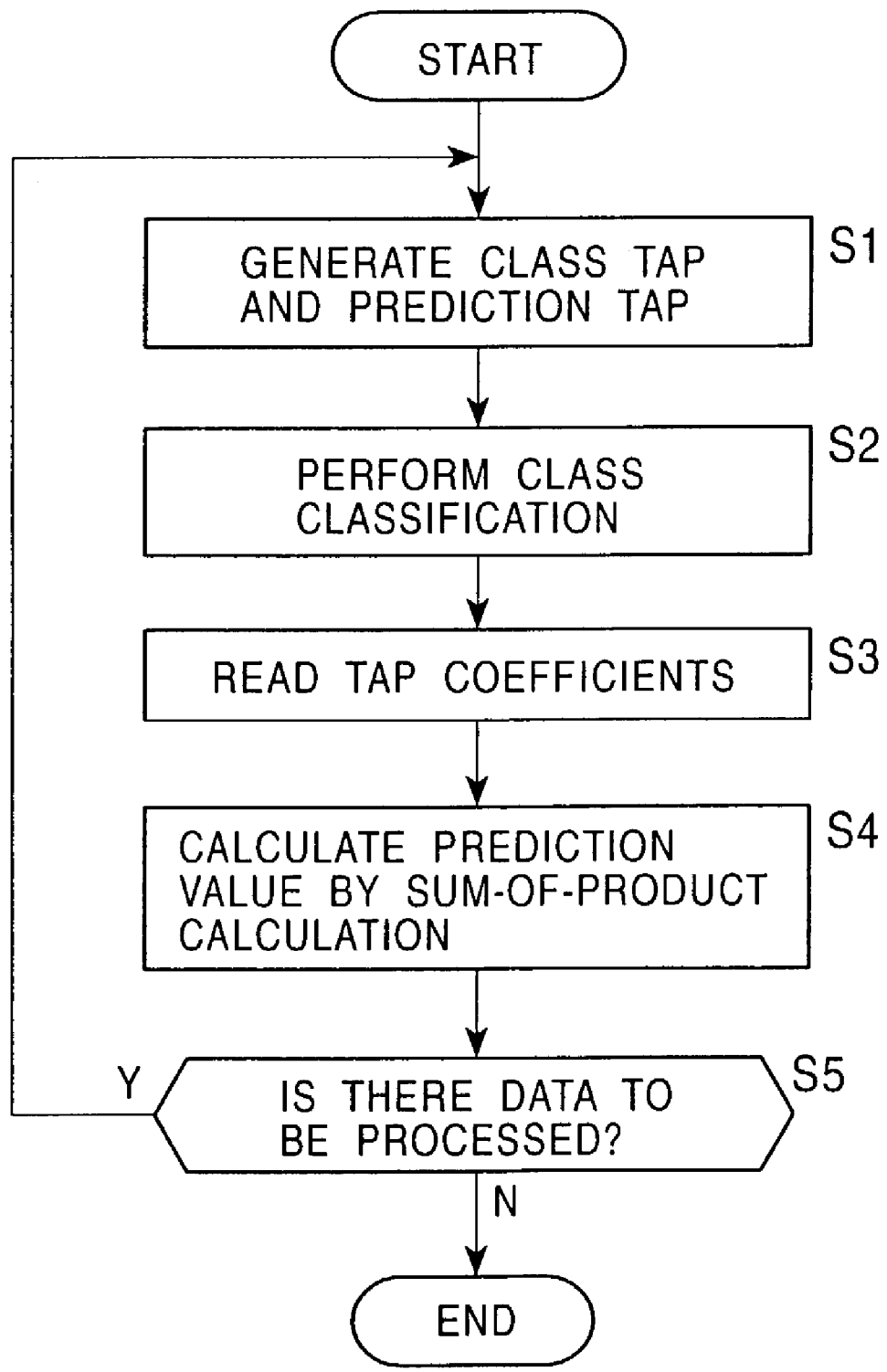
FIG. 5 is a flowchart describing processing executed by the decoder 2.

Processing (decoding processing) executed by the decoder 2 shown in FIG. 2 will be described next by referring to a flowchart shown in FIG. 5.

The decoding section 21 decodes the encoded data according to a decoding method corresponding to the encoding method used in the encoder 1, and sends the first decoded data obtained as a result to the encoding section 22 and to the class-classification adaptive processing circuit 24. The decoding section 21 also sends information obtained in a process of decoding the encoded data to the class-classification adaptive processing circuit 24 as the first additional information. The encoding section 22 re-encodes the decoded data sent from the decoding section 21, and sends re-encoded data obtained as a result to the decoding section 23. The decoding section 23 decodes the re-encoded data sent from the encoding section 22 and sends the second decoded data obtained as a result to the class-classification adaptive processing circuit 24, in the same way as in the decoding section 21. The decoding section 23 also sends information obtained in a process of decoding the re-encoded data to the class-classification adaptive processing circuit 24 as the second additional information.

In the class-classification adaptive processing circuit 24 (FIG. 3), in step S1, the tap generation section 31 sequentially sets the first decoded data input thereto to aimed-at data, generates a prediction tap for the aimed-at data, for example, from first decoded data closer in time or in space to the aimed-at data, second decoded data closer in time or in space to the second decoded data corresponding to the aimed-at data, the first additional information obtained in the decoding process of the aimed-at data, and the second additional information obtained in the decoding process of the second decoded data corresponding to the aimed-at data, and outputs the prediction tap to the prediction section 35. Also in step S1, the tap generation section 32 generates a class tap for the aimed-at data, for example, in the same way as the tap generation section 31, and outputs the class tap to the class classification section 33.

Then, the processing proceeds to step S2, and the class classification section 33 performs class classification according to the class tap sent from the tap generation section 32, and sends a class code obtained as a result to the coefficient memory 34. Then, the processing proceeds to step S3.

In step S3, the coefficient memory 34 reads the tap coefficients at the address corresponding to the class code sent from the class classification section 33, and sends the tap coefficients to the prediction section 35.

Then, the processing proceeds to step S4, and the prediction section 35 obtains the tap coefficients output from the coefficient memory 34, and performs the sum-of-products calculation indicated in expression (1) by using the tap coefficients and the prediction tap sent from the tap generation section 31 to obtain (a prediction value of) data acquired by improving the quality of the aimed-at data. The processing proceeds to step S5.

In step S5, it is determined whether there still is first decoded data to be processed as aimed-at data. When it is determined that there is, the processing returns to step S1, first decoded data to be set to aimed-at data next is set to new aimed-at data, and the same processes are repeated. In step S5, when it is determined that there is not data to be processed as aimed-at data, the processing is terminated.

Figure 6:
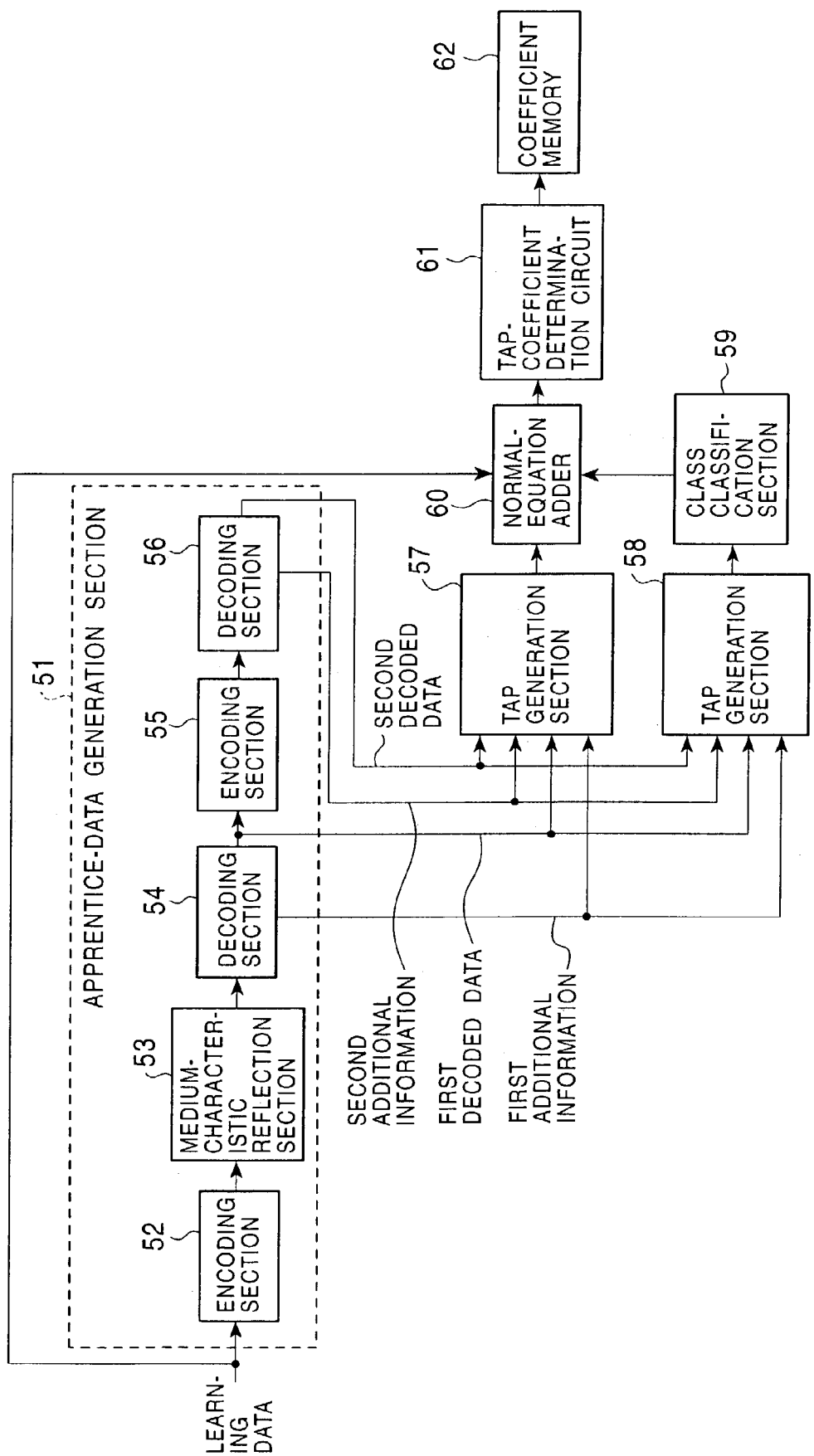
FIG. 6 is a block diagram showing an example structure of a learning apparatus according to an embodiment of the present invention.

Next, FIG. 6 shows an example structure of a learning apparatus for performing learning processing for tap coefficients to be stored in the coefficient memory 34 shown in FIG. 3, according to an embodiment.

For example, high-quality data corresponding to data to be encoded by the encoder 1 shown in FIG. 1 is input to the learning apparatus as learning data. This learning data is sent to an apprentice-data generation section 51 and to a normal-equation adder 60 as master data serving as a master in learning.

The apprentice-data generation section 51 generates apprentice data serving as an apprentice in learning from the master data input thereto.

Specifically, the apprentice-data generation section 51 is formed of an encoding section 52, a medium-characteristic reflection section 53, a decoding section 54, an encoding section 55, and a decoding section 56.

The encoding section 52 encodes the master data in the same way as the encoder 1 shown in FIG. 1, and sends encoded data obtained as a result to the medium-characteristic reflection section 53. The medium-characteristic reflection section 53 adds (gives) noise and other attached to a signal when the signal passes through the recording medium 3 or the transfer medium 4 shown in FIG. 1, to the encoded data sent from the encoding section 52, and sends the result to the decoding section 54.

The decoding section 54, the encoding section 55, and the decoding section 56 have structures similar to those of the decoding section 21, the encoding section 22, and decoding section 23 in the decoder 2 shown in FIG. 2, respectively. Therefore, the decoding section 54, the encoding section 55, and the decoding section 56 apply processing to encoded data output from the medium-characteristic reflection section 53, in similar manners to those of the decoding section 21, the encoding section 22, and the decoding section 23 shown in FIG. 2, respectively. As a result, the decoding section 54 outputs first decoded data and first additional information as apprentice data, and the decoding section 56 outputs second decoded data and second additional information as apprentice data. The first decoded data and the first additional information, and the second decoded data and the second additional information serving as apprentice data are sent to tap generation sections 57 and 58.

In the decoder 2 shown in FIG. 2, as described above, one or more sets similar to the set of the encoding section 22 and the decoding section 23 can be provided in a subsequent stage of the decoding section 23. In this case, in the apprentice-data generation section 51 in the learning apparatus shown in FIG. 6, in the same way as in the decoder 2, one or more sets similar to the set of the encoding section 55 and the decoding section 56 need to be provided in a subsequent stage of the decoding section 54.

The tap generation section 57 is configured in the same way as the tap generation section 31 in the class-classification adaptive processing circuit 24 shown in FIG. 3. The tap generation section 57 generates a prediction tap from the first decoded data and the first additional information, and the second decoded data and the second additional information serving as apprentice data input thereto, in the same way as the tap generation section 31, and sends the prediction tap to the normal-equation adder 60.

The tap generation section 58 is configured in the same way as the tap generation section 32 in the class-classification adaptive processing circuit 24 shown in FIG. 3. The tap generation section 58 generates a class tap from the first decoded data and the first additional information, and the second decoded data and the second additional information serving as apprentice data input thereto, in the same way as the tap generation section 32, and sends the class tap to the class classification section 59.

The class classification section 59 performs class classification according to the class tap sent from the tap generation section 58 in the same way as the class classification section 33 in the class-classification adaptive processing circuit 24 shown in FIG. 3, and sends a class code obtained as a result to the normal-equation adder 60.

The normal-equation adder 60 sequentially sets the master data input thereto to the aimed-at master data, and performs additions for the prediction tap generated for the aimed-at master data, sent from the tap generation section 57, and for the aimed-at master data, in each class indicated by the class code sent from the class classification section 59.

Specifically, the normal-equation adder 60 uses the prediction tap (apprentice data) to perform calculations corresponding to multiplication ($X_{in}X_{im}$) and summation ($\Sigma$) between apprentice data, which produce the components of the matrix A in expression (8), for each class corresponding to the class code sent from the class classification section 59.

The normal-equation adder 60 also uses the prediction tap (apprentice data) and the aimed-at master data to perform calculations corresponding to multiplication ($x_{in}y_i$) and summation ($\Sigma$) between the apprentice data and the aimed-at master data, which produce the components of the vector v in expression (8), for each class corresponding to the class code sent from the class classification section 59.

The normal-equation adder 60 performs the above-described additions for all master data input thereto being set to aimed-at master data, and generates the normal equation indicated by expression (8) for each class.

A tap-coefficient determination circuit 61 solves the equation generated for each class in the normal-equation adder 60 to obtain tap coefficients for each class, and sends them as the address corresponding to each class in a coefficient memory 62.

Depending on the amount or content of learning data, the number of normal equations required for obtaining tap coefficients cannot be obtained in the normal-equation adder 60 for a class in some cases. The tap-coefficient determination circuit 61 outputs, for example, default tap coefficients for such a class.

The coefficient memory 62 stores tap coefficients for each class, sent from the tap-coefficient determination circuit 61.

Figure 7:
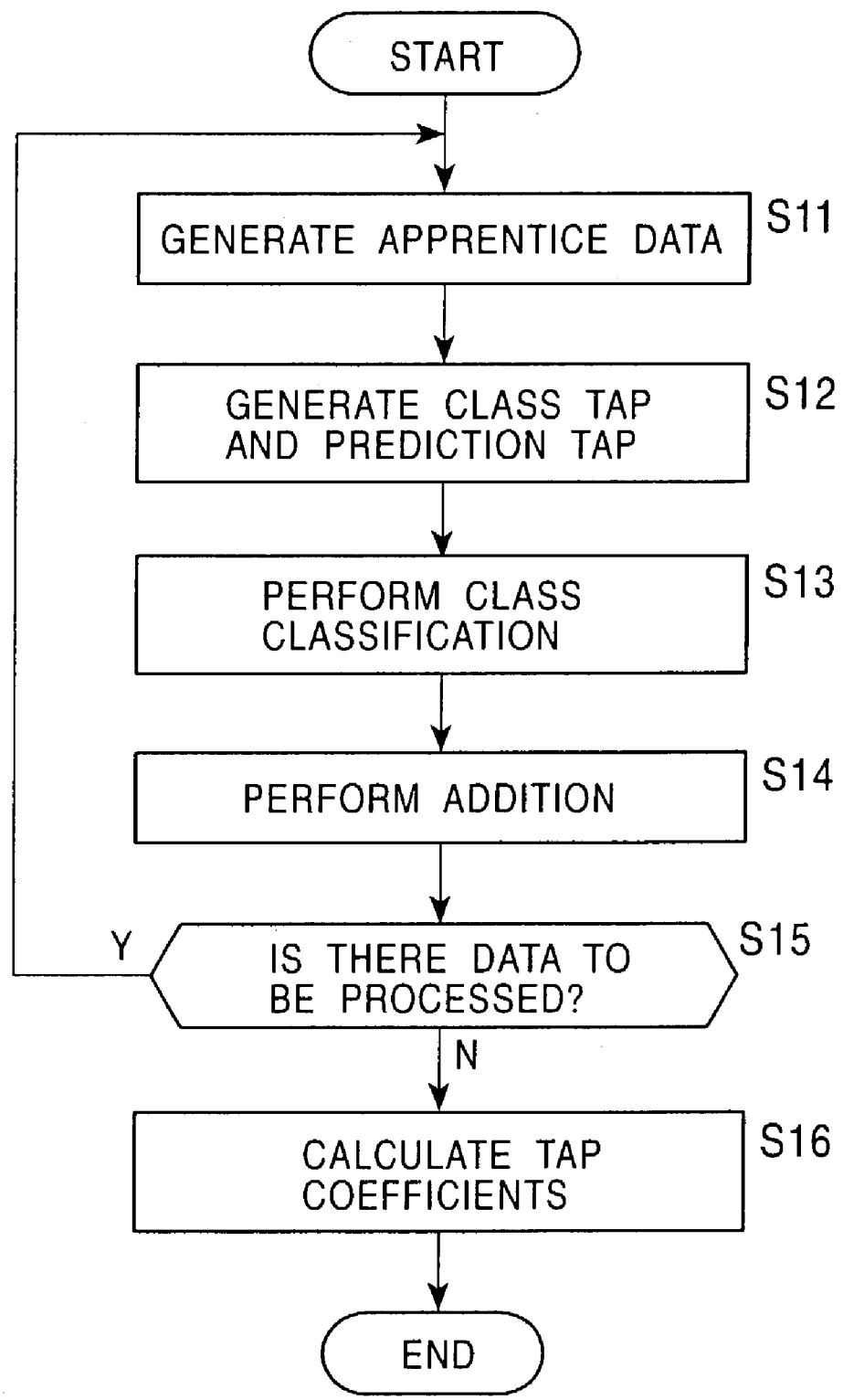
FIG. 7 is a flowchart describing processing executed by the learning apparatus.

Processing (learning processing executed by the learning apparatus shown in FIG. 6 will be described next by referring to a flowchart shown in FIG. 7.

Learning data is sent to the learning apparatus. This learning data is input to the apprentice-data generation section 51 and to the normal-equation adder 60 as master data. In step S11, the apprentice-data generation section 51 generates apprentice data from the master data.

Specifically, in step S11, the encoding section 52 encodes the master data in the same way as the encoder 1 shown in FIG. 1, and sends encoded data obtained as a result to the decoding section 54 through the medium-characteristic reflection section 53. The decoding section 54 decodes the encoded data input thereto, and sends first decoded data obtained as a result to the encoding section 55, and also as apprentice data to the tap generation sections 57 and 58. The decoding section 54 also sends first additional information obtained in a process for decoding the encoded data to generate the first decoded data, to the tap generation sections 57 and 58 as apprentice data.

Further, in step S11, the encoding section 55 re-encodes the first decoded data sent from the decoding section 54, and sends re-encoded data obtained as a result to the decoding section 56. The decoding section 56 decodes the re-encoded data sent from the encoding section 55, and sends second decoded data obtained as a result, and second additional information obtained in a process of decoding the re-encoded data to generate the second decoding data, to the tap generation sections 57 and 58 as apprentice data.

Then, the normal-equation adder 60 sets the master data input thereto to aimed-at master data, and the processing proceeds to step S12. The tap generation sections 57 and 58 generate a prediction tap and a class tap for the aimed-at master data from the apprentice data input thereto. The prediction tap generated by the tap generation section 57 is sent to the normal-equation adder 61, and the class tap generated by the tap generation section 58 is sent to the class classification section 59.

Then, the processing proceeds to step S13, and the class classification section 59 performs class classification according to the class tap sent from the tap generation section 58, and sends a class code obtained as a result to the normal-equation adder 60. The processing proceeds to step S14.

In step S14, the normal-equation adder 60 applies the above-described additions for the matrix A and the vector v in expression (8) to the aimed-at master data input thereto and the apprentice data constituting the prediction tap sent from the tap generation section 57 in the class indicated by the class code sent from the class classification section 59. The processing proceeds to step S15.

In step S15, it is determined whether there is master data to be processed as aimed-at master data. When it is determined that there is, the processing returns to step S11, and the same processes are repeated, for example, with master data sent next being set to new aimed-at master data.

When it is determined in step S15 that there is no master data to be processed as aimed-at master data, in other words, for example, the normal-equation adder 60 obtains a normal equation for each class, the processing proceeds to step S16. The tap-coefficient determination circuit 61 solves the normal equation generated for each class to obtained tap coefficients for each class, and sends and stores them at the address corresponding to the class in the coefficient memory 62. Then, the processing is terminated.

As described above, the tap coefficients for each class, stored in the coefficient memory 62 is stored in the coefficient memory 34 shown in FIG. 3.

Therefore, since the tap coefficients stored in the coefficient memory 34 shown in FIG. 3 are obtained by learning executed such that the prediction error (square error, in this case) of a prediction value of data having the same quality as learning data, obtained when a linear prediction calculation is performed, becomes statistically minimum, the final decoded data output from the prediction section 35 shown in FIG. 3 has the same quality as the learning data.

Figure 8:
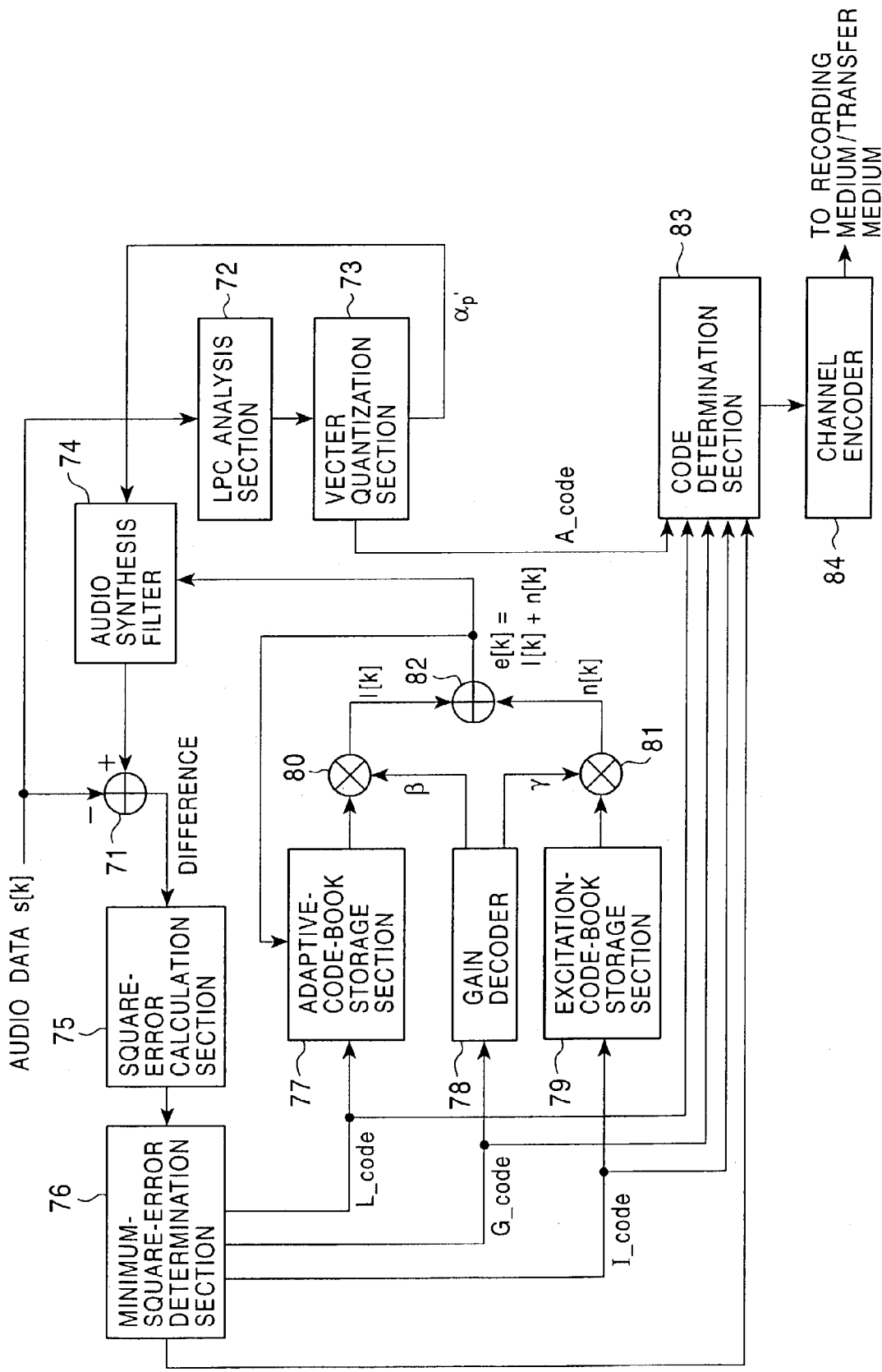
FIG. 8 is a block diagram showing a first example structure of an encoder 1 and encoding sections 22, 52, and 55.

Next, FIG. 8 shows an example structure of the encoder 1 shown in FIG. 1 used when the data transfer system shown in FIG. 1 encodes an audio signal (audio data) by a CELP (including various types of CELPs such as VSELP (vector sum excited liner prediction), PSI-CELP (pitch synchronous innovation CELP), and CS-ACELP (conjugate structure algebraic CELP)) method and transfers it. As described above, when the encoder 1 shown in FIG. 1 is configured as shown in FIG. 8, the encoding section 22 shown in FIG. 2 and the encoding sections 52 and 55 shown in FIG. 6 are also configured as shown in FIG. 8.

An audio signal (including that of voice and that of a musical piece) to be encoded is obtained, for example, by sampling an analog audio signal at a sampling frequency of 8 kHz or the like to A/D convert to a digital audio signal and further by quantizing at a predetermined number of bits, and is sent to a calculator 71 and to an LPC (liner prediction coefficient) analysis section 72.

The LPC analysis section 72 applies LPC analysis to the audio signal to be encoded, input thereto, for example, in units of frames each having 160 samples to obtain p-th linear prediction coefficients $\alpha_1, \alpha_2, \ldots, \alpha_p$. Then, the LPC analysis section 72 sends a vector having the p-th linear prediction coefficients $\alpha_p$ (p=1, 2, ..., P) as its elements to a vector quantization section 73 as an audio feature vector.

The vector quantization section 73 stores a code book in which code vectors having linear prediction coefficients as their elements are associated with codes, applies vector quantization to the feature vector a sent from the LPC analysis section 72, and sends a code (hereinafter called an A code (A_code), if necessary) obtained as a result of vector quantization to a code determination section 83.

In addition, the vector quantization section 73 sends the linear prediction coefficients $\alpha_1', \alpha_2', \ldots, \alpha_p'$ serving as the elements of the code vector $\alpha'$ corresponding to the A code to an audio synthesis filter 74.

The audio synthesis filter 74 is, for example, an IIR (infinite impulse response) type digital filter, and uses the linear prediction coefficients $\alpha_p'$ (p=1, 2, ..., P) sent from the vector quantization section 73 as the tap coefficients of the IIR filter and a remainder signal 3 sent from the calculator 82 as an input signal to perform audio synthesis.

More specifically, in the LPC analysis executed by the LPC analysis section 72, assuming that linear coupling indicated by the following expression is satisfied for an audio signal (sample value) $s_n$ at the current time n and past P sample values $s_{n-1}, s_{n-2}, \ldots, s_{n-P}$ adjacent thereto, $$s_n + \alpha_1 s_{n-1} + \alpha_2 s_{n-2} + \ldots + \alpha_P s_{n-P} = e_n \qquad (9)$$

when a prediction value (linear prediction value) $s_n'$ for the sample value $s_n$ at the current time n is linearly predicted by the following expression with the use of past P sample values $s_{n-1}, s_{n-2}, \ldots, s_{n-P}$, $$s_n' = -(\alpha_1 s_{n-1} + \alpha_2 s_{n-2} + \ldots + \alpha_P s_{n-P}) \quad (10)$$

linear prediction coefficients $\alpha_P$ which make the square error between the actual sample value $s_n$ and the linearly predicted value $s_n'$ minimum are to be obtained.

In expression (9), $\{e_n\}$ ($\ldots, e_{n-1}, e_n, e_{n+1}, \ldots$) indicates random variables having an average of 0, a variance of a predetermined value $\sigma_2$, and no correlation with each other.

From expression (9), the sample value $s_n$ can be expressed by the following expression.

$$s_n = e_n - (\alpha_1 s_{n-1} + \alpha_2 s_{n-2} + \ldots + \alpha_P s_{n-P}) \quad (11)$$

When Z transform is applied to this expression, the following expression is satisfied.

$$S = E/(1 + \alpha_1 z^{-1} + \alpha_2 z^{-2} + \ldots + \alpha_P z^{-P}) \quad (12)$$

In expression (12), S and E indicate values obtained when Z transform is applied to $s_n$ and $e_n$ in expression (11), respectively.

From expressions (9) and (10), $e_n$ can be expressed as follows:

$$e_n = s_n - s_n' \quad (13)$$

and is called a remainder signal between the actual sample value $s_n$ and the linearly predicted value $s_n'$.

Therefore, from expression (12), when the linear prediction coefficients $\alpha_P$ are used as the tap coefficients of the IIR filter and the remainder signal $e_n$ is used as the input signal of the IIR filter, the audio signal $s_n$ can be obtained.

As described above, the audio synthesis filter 74 uses the linear prediction coefficients $\alpha_P'$ sent from the vector quantization section 73 as tap coefficients, and the remainder signal e sent from the calculator 82 as an input signal to calculate expression (12) to obtain an audio signal (synthesized audio signal) ss.

The audio synthesis filter 74 uses not the linear prediction coefficients $\alpha_P$ obtained as a result of LPC analysis executed by the LPC analysis section 72 but the linear prediction coefficients $\alpha_P'$ serving as the code vector corresponding to the code obtained as a result of the vector quantization of the linear prediction coefficients $\alpha_P$, a synthesized audio signal output from the audio synthesis filter 74 is basically not the same as the audio signal obtained before the LPC analysis.

The synthesized audio signal ss output from the audio synthesis filter 72 is sent to the calculator 71. The calculator 71 subtracts the original audio signal s from the synthesized audio signal ss sent from the audio synthesis filter 74 (subtracts from each sample of the synthesized audio signal ss the sample of the original audio signal s corresponding to the sample of the synthesized audio signal), and sends the remainder to a square-error calculation section 75. The square-error calculation section 75 calculates the square sum of the remainders sent from the calculator 71 (for example, a square sum in units of frames to which the LPC analysis section 72 applies LPC analysis), and sends a square error obtained as a result to a minimum-square-error determination section 76.

The minimum-square-error determination section 76 stores a L code (L_code) serving as a code indicating a lag, a G code (G_code) serving as a code indicating a gain, and an I code (I_code) serving as a code indicating a code word (excitation code book) in association with square errors output from the square-error calculation section 75, and outputs the L code, the G code, and the L code associated with the square error output from the square-error calculation section 75. The L code is sent to an adaptive-code-book storage section 77, the G code is sent to a gain decoder 78, and I code is sent to an excitation-code-book storage section 79. In addition, the L code, the G code, and the I code are also sent to the code determination section.

The adaptive-code-book storage section 77 stores an adaptive code book in which, for example, seven-bit L codes and predetermined delay time (lags) are associated with, delays the remainder signal e sent from the calculator 82 by the delay time corresponding to the L code sent from the minimum-square-error determination section 76, and outputs to a calculator 80.

Since the adaptive-code-book storage section 77 delays the remainder signal e by the time corresponding to the L code and outputs it, the output signal is similar to a periodic signal having the delay time as the period. The signal mainly serves as a driving signal for generating a voiced synthesis sound in sound synthesis which uses linear prediction coefficients.

The gain decoder 78 stores a table in which G codes and predetermined gains $\beta$ and $\gamma$ are associated with, and outputs the gains $\beta$ and $\gamma$ associated with the G code sent from the minimum-square-error determination section 76. The gains $\beta$ and $\gamma$ are sent to the calculators 80 and 81, respectively. The gain $\beta$ is called a long-term filter-state output gain, the gain $\gamma$ is called an excitation code book gain.

The excitation-code-book storage section 79 stores an excitation code book in which, for example, nine-bit I codes and predetermined excitation signals are associated with, and outputs the excitation signal associated with the I code sent from the minimum-square-error determination section 76 to the calculator 81.

Excitation signals stored in the excitation code book are, for example, similar to white noise, and mainly serve as driving signals for generating unvoiced synthesis sounds in sound synthesis which uses linear prediction coefficients.

The calculator 80 multiplies the output signal of the adaptive-code-book storage section 77 by the gain $\beta$ output from the gain decoder 78, and sends a product 1 to the calculator 82. The calculator 81 multiplies the output signal of the excitation-code-book storage section 79 by the gain $\gamma$ output from the gain decoder 78, and sends a product n to the calculator 82. The calculator 82 adds the product 1 sent from the calculator 80 to the product n sent from the calculator 81, and sends the sum to the audio synthesis filter 74 and to the adaptive-code-book storage section 77 as a remainder signal e.

In the audio synthesis filter 74, the remainder signal 3 sent from the calculator 82 as described above is filtered by the IIR filter having the linear prediction coefficients αP' sent from the vector quantization section 73 as tap coefficients, and a synthesized audio signal obtained as a result is sent to the calculator 71. The same processing as described above is performed in the calculator 71 and the square-error calculation section 75, and a square error obtained as a result is sent to the minimum-square-error determination section 76.

The minimum-square-error determination section 76 determines whether a square error sent from the square-error calculation section 75 becomes the minimum (minimal). When the minimum-square-error determination section 76 determines that the square error is not the minimum, it outputs the L code, the G code, and the L code corresponding to the square error as described above. Then, the same processing is repeated.

In contrast, when the minimum-square-error determination section 76 determines that the square error becomes the minimum, it outputs a decision signal to the code determination section 83. The code determination section 83 latches an A code sent from the vector quantization section 73, and sequentially latches an L code, G code, and an I code sent from the minimum-square-error determination section 76. When the code determination section 83 receives a decision signal from the minimum-square-error determination section 76, it sends the A code, the L code, the G code, and the I code being latched to the channel encoder 84. The channel encoder 84 multiplexes the A code, the L code, the G code, and the I code sent from the code determination section 83, and sends a code data obtained as a result of multiplexing as encoded data.

To simplify a description, it is assumed that an A code, an L code, a G code, and an I code are obtained in each frame. It is also possible, for example, that one frame is divided into four sub-frames, and an L code, a G code, and an I code are obtained in each sub-frame.

In FIG. 8 (also in FIG. 9, described later), [k] is added to each variable to make it to an array variable. This "k" indicates the number of frames. The description of "k" will be omitted appropriately in the specification.

Figure 9:
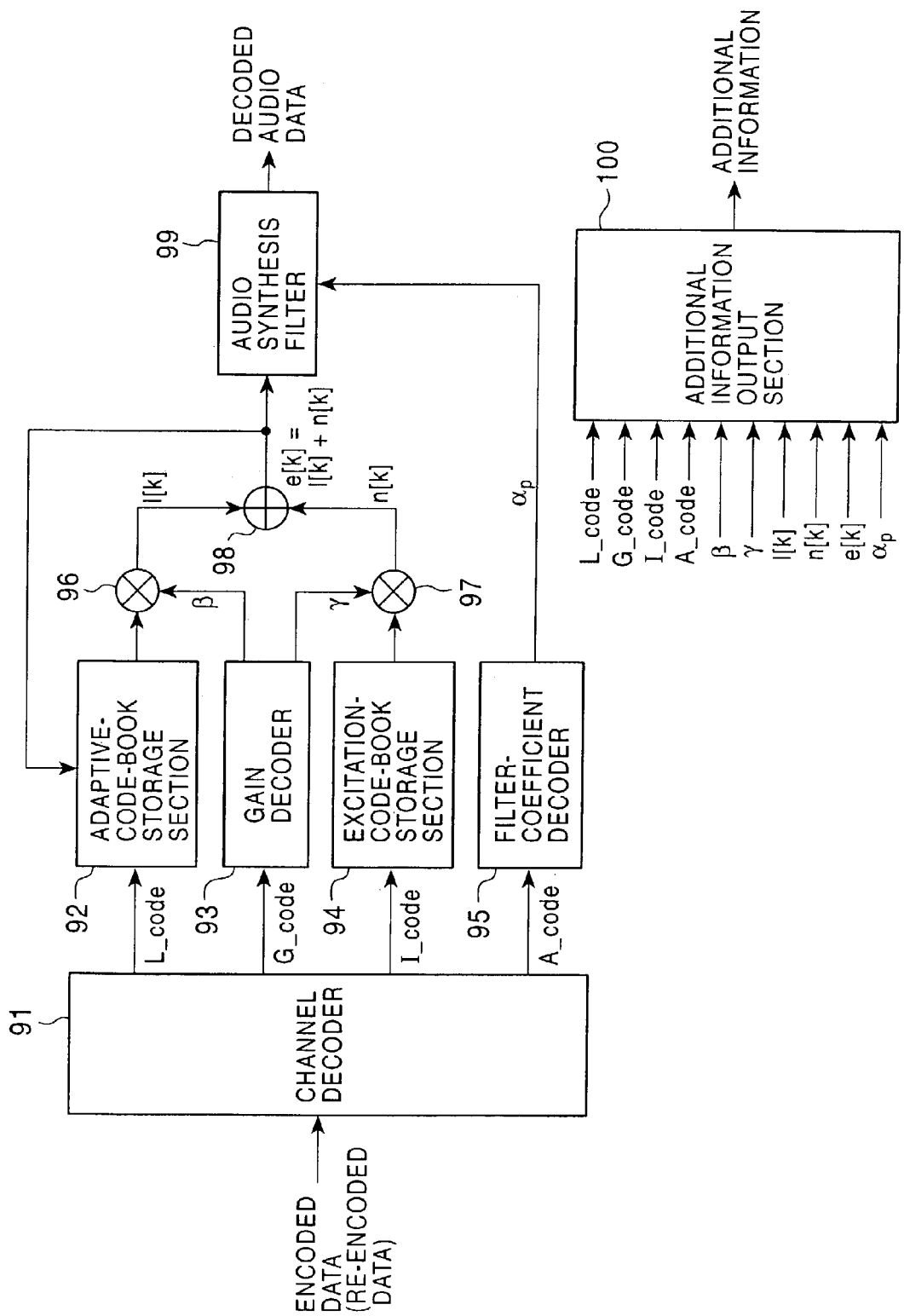
FIG. 9 is a block diagram showing a first example structure of decoding sections 21, 23, 54, and 56.

FIG. 9 shows an example structure of the decoding section 21 shown in FIG. 2, used when the encoder 1 shown in FIG. 1 is configured as shown in FIG. 8. As described above, when the decoding section 21 shown in FIG. 2 is configured as shown in FIG. 9, the decoding section 23 shown in FIG. 2 and the decoding sections 54 and 56 shown in FIG. 6 are also configured as shown in FIG. 9.

The code data, serving as encoded data, output from the encoder 1 shown in FIG. 8 is received by a channel decoder 91. The channel decoder 91 separates the L code, the G code, the I code, and the A code from the code data, and sends them to an adaptive-code-book storage section 92, a gain decoder 93, an excitation-code-book storage section 94, and a filter-coefficient decoder 95, respectively.

The adaptive-code-book storage section 92, the gain decoder 93, the excitation-code-book storage section 94, and calculators 96 to 98 are configured in the same way as the adaptive-code-book storage section 77, the gain decoder 78, the excitation-code-book storage section 79, and calculators 80 to 82. The same processing as that described by referring to FIG. 8 is performed, so that the L code, the G code, and the I code are decoded to generate the remainder signal e. The remainder signal 3 is sent to an audio synthesis filter 99 as an input signal, and also sent to the adaptive-code-book storage section 92.

The filter-coefficient decoder 95 stores the same code book as that stored in the vector quantization section 73 shown in FIG. 8, decodes the A code to generate linear prediction coefficients $\alpha_P'$, and sends it to the audio synthesis filter 99.

The audio synthesis filter 99 is configured in the same way as the audio synthesis filter 74 shown in FIG. 8. The audio synthesis filter 99 uses the linear prediction coefficients $\alpha_P'$ sent from the filter-coefficient decoder 95 as tap coefficients, and the remainder signal e sent from the calculator 98 as an input signal to calculate expression (12) to obtain the synthesized audio signal obtained when the minimum-square-error determination section 76 determines that the square error is minimum. The synthesized audio signal is output as the decoding result (decoded data) of the encoded data.

An additional-information output section 100 acquires information obtained in a process of decoding the encoded data to generate the synthesized audio signal serving as decoded data, as described above, and outputs a part or the whole of the information as additional information.

More specifically, the additional-information output section 100 receives the L code, the G code, the I code, and the A code output from the channel decoder 91, the gains β and γ output from the gain decoder 93, the linear prediction coefficients αP output from the filter-coefficient decoder 95, the calculation result 1 output from the calculator 96, the calculation result γ output from the calculator 97, and the remainder signal e output from the calculator 98, and others, and outputs a part or the whole of these pieces of information as additional information.

Figure 10:
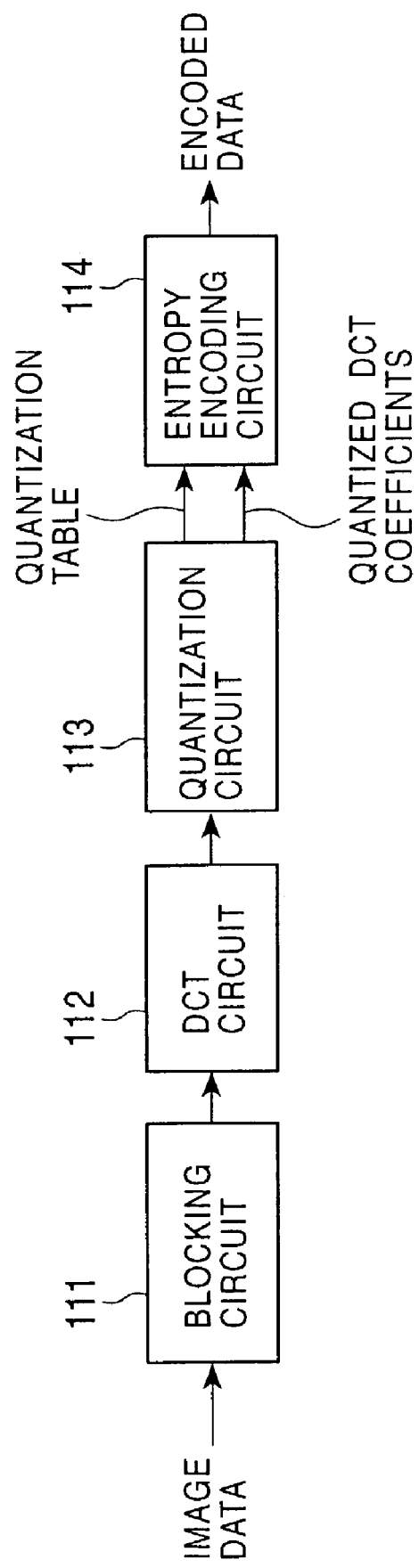
FIG. 10 is a block diagram showing a second example structure of the encoder 1 and the encoding sections 22, 52, and 55.

Next, FIG. 10 shows an example structure of the encoder 1 shown in FIG. 1 used when the data transfer system shown in FIG. 1 encodes still-picture image data by a JPEG method and transfers it. When the encoder 1 shown in FIG. 1 is configured as shown in FIG. 10, the encoding section 22 shown in FIG. 2 and the encoding sections 52 and 55 shown in FIG. 6 are also configured in the same way as shown in FIG. 10.

Image data to be encoded is input to a blocking circuit 111. The blocking circuit 111 divides the image data input thereto into blocks each formed of 64 pixels, eight by eight pixels. Each block obtained by the blocking circuit 111 is sent to a DCT circuit 112. The DCT circuit 112 applies DCT (discrete cosine transform) processing to each block sent from the blocking circuit 111 to transform to a total of 64 DCT coefficients, one DC (direct current) component and 63 frequency components (AC (alternating current) components) in a horizontal direction and a vertical direction. 64 DCT coefficients in each block are sent from the DCT circuit 112 to the quantization circuit 113.

The quantization circuit 113 quantizes the DCT coefficients sent from the DCT circuit 112 according to a predetermined quantization table, and sends the results (hereinafter called quantized DCT coefficients, if necessary) of quantization to an entropy encoding circuit 114 together with the quantization table sued for quantization.

The quantization table used in the quantization circuit 113 generally has quantization steps such that DCT coefficients having low frequencies, which are highly important, are quantized finely and DCT coefficients having high frequencies, which are lowly important, are quantized coarsely with human visual characteristics being taken into account. Therefore, the deterioration of image quality is suppressed, and highly efficient compression is performed.

In JPEG encoding, a quantization table to be used is determined, for example, according to a compression rate specified by the user.

The entropy encoding circuit 114 applies entropy encoding processing, such as Huffman encoding to the quantized DCT coefficients sent from the quantization circuit 113, adds the quantization table sent from the quantization circuit 113, and outputs encoded data obtained as a result.

Figure 11:
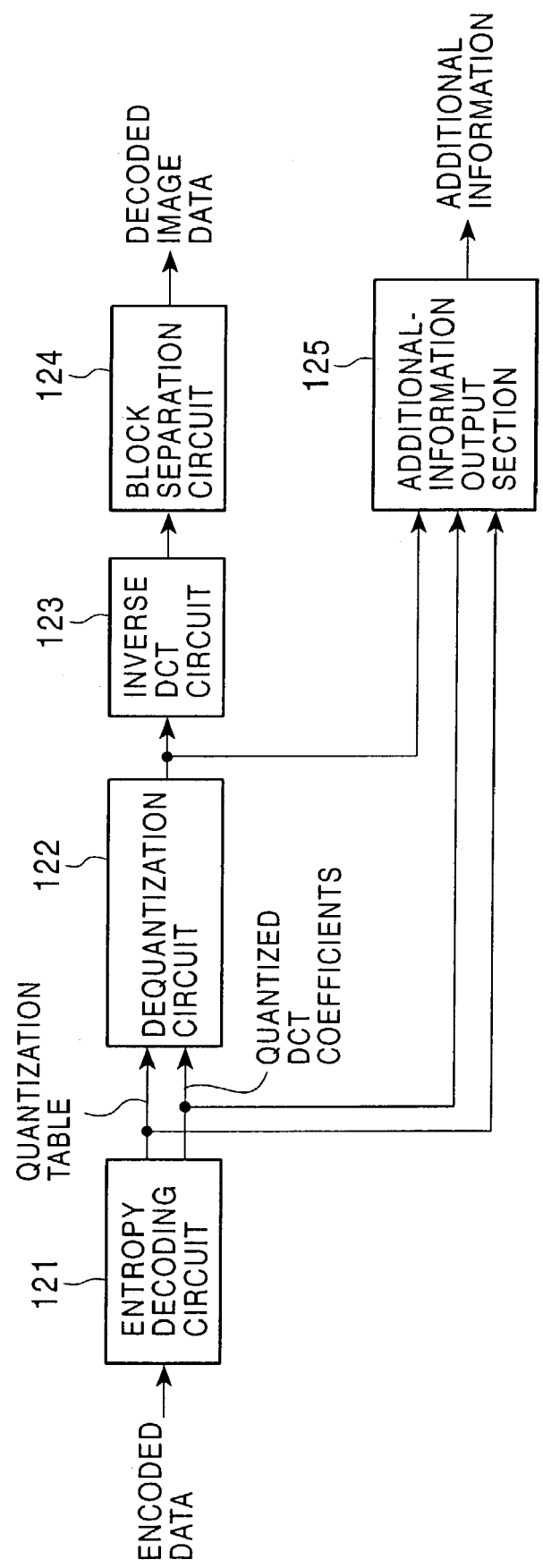
FIG. 11 is a block diagram showing a second example structure of the decoding sections 21, 23, 54, and 56.

Next, FIG. 11 shows an example structure of the decoding section 21 shown in FIG. 2 used when the encoder 1 shown in FIG. 1 is configured as shown in FIG. 10. When the decoding section 21 shown in FIG. 2 are configured as shown in FIG. 11, the decoding section 23 shown in FIG. 2 and the decoding section 54 and 56 shown in FIG. 6 are also configured in the same way as shown in FIG. 11.

The encoded data is input to an entropy decoding circuit 121. The entropy decoding circuit 121 separates the encoded data into the quantized DCT coefficients entropy-encoded and the quantization table. In addition, the entropy decoding circuit 121 applies entropy decoding to the quantized DCT coefficients entropy-encoded, and sends quantized DCT coefficients obtained as a result to a dequantization circuit 122 together with the quantization table. The dequantization circuit 122 dequantizes the quantized DCT coefficients sent from the entropy decoding circuit 121 according to the quantization table also sent from the entropy decoding circuit 121, and sends DCT coefficients obtained as a result to an inverse DCT circuit 123. The inverse DCT circuit 123 applies inverse DCT processing to the DCT coefficients sent from the dequantization circuit 12, and sends a decoded block of eight-by-eight pixels obtained as a result to a block separation circuit 124. The block separation circuit 124 unblocks the decoded block sent from the inverse DCT circuit 123 to obtain and output decoded image data.

An additional-information output section 125 acquires information obtained in a process of decoding the encoded data to generate the decoded image data, as described above, and outputs a part or the whole of the information as additional information.

More specifically, the additional-information output section 125 receives the quantization table and the quantized DCT coefficients output from the entropy decoding circuit 121, the DCT coefficients output from the dequantization circuit 122, and others, and outputs a part or the whole of these pieces of information as additional information.

Figure 12:
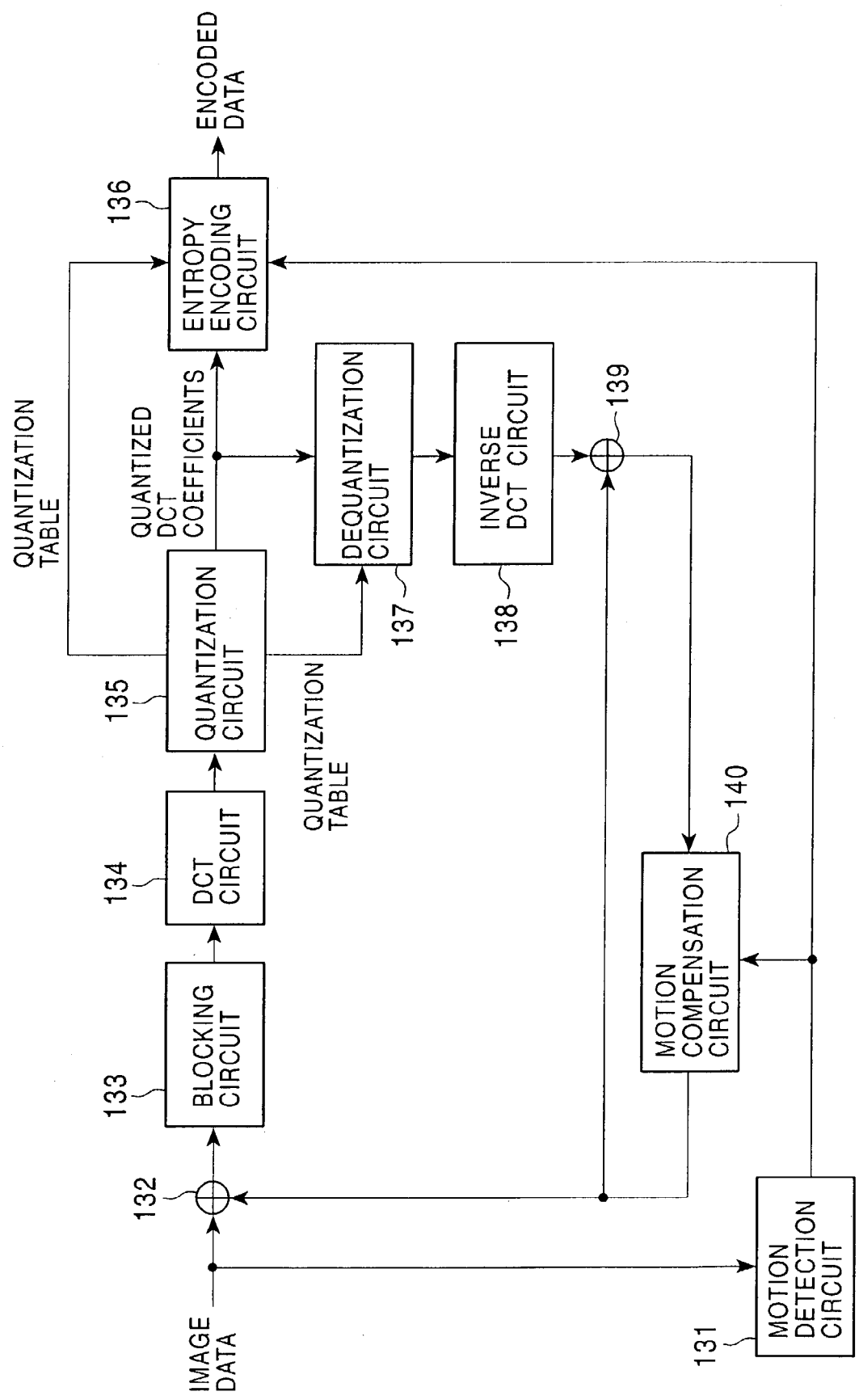
FIG. 12 is a block diagram showing a third example structure of the encoder 1 and the encoding sections 22, 52, and 55.

Next, FIG. 12 shows an example structure of the encoder 1 shown in FIG. 1 used when the data transfer system shown in FIG. 1 encodes motion-picture image data by the MPEG2 method and transfers it. When the encoder 1 shown in FIG. 1 is configured as shown in FIG. 12, the encoding section 22 shown in FIG. 2 and the encoding sections 52 and 55 shown in FIG. 6 are also configured in the same way as shown in FIG. 12.

A frame (or fields) constituting a motion picture to be MPEG-encoded are sequentially sent to a motion detection circuit 131 and to a calculator 132.

The motion detection circuit 131 detects a motion vector in units macro-blocks for the frame input thereto, and sends it to an entropy encoding circuit 136 and to a motion compensation circuit 140.

When an I (intra) picture is input to the calculator 132, the calculator 132 sends it as is to a blocking circuit 133, and when a P (predictive) or B (bidirectionally predictive) picture is input to the calculator 132, the calculator 132 calculates the difference between the picture and a reference image sent from the motion compensation circuit 140, and sends the difference to the blocking circuit 133.

The blocking circuit 133 blocks the output of the calculator 132 into pixel blocks each having eight-by-eight pixels, and send them to a DCT circuit 134. The DCT circuit 134 applies DCT processing to the pixel blocks sent from the blocking circuit 133, and sends DCT coefficients obtained as a result to a quantization circuit 135. The quantization circuit 135 quantizes the DCT coefficients sent from the DCT circuit 133 in units of blocks according to a predetermined quantization table, and sends quantized DCT coefficients obtained as a result to the entropy encoding circuit 136 together with the used quantization table. The entropy encoding circuit 136 applies entropy encoding to the quantized DCT coefficients sent from the quantization circuit 135, adds the motion vector sent from the motion detection circuit 131, the quantization table sent from the quantization circuit 135, and other necessary information (such as information serving as the header of an MPEG stream in each layer), and outputs encoded data obtained as a result as an MPEG-encoded result.

Among the quantized DCT coefficients output from the quantization circuit 135, those for an I picture and a P picture are sent to the entropy encoding circuit 136 and to a dequantization circuit 137 because an I picture and a P picture need to be locally decoded so as to be used as reference images for a P picture and a B picture to be encoded later. The quantization table used in the quantization circuit 135 is also sent to the dequantization circuit 137.

The dequantization circuit 137 dequantizes the quantized DCT coefficients sent from the quantization circuit 135 according to the quantization table sent from the quantization circuit 135 to generate DCT coefficients, and sends them to an inverse DCT circuit 138. The inverse DCT circuit 138 applies inverse DCT processing to the DCT coefficients sent from the dequantization circuit 137, and sends to a calculator 139. In addition to the output of the inverse DCT circuit 138, a reference image output from the motion compensation circuit 140 is also sent to the calculator 139. When the output of the inverse DCT circuit 138 is for a P picture, the calculator 139 adds the output to the output of the motion compensation circuit 140 to generate the original image, and sends to the motion compensation circuit 140. When the output of the inverse DCT circuit 138 is for an I picture, since the output is an decoded image of an I picture, the calculator 139 sends it as is to the motion compensation circuit 140.

The motion compensation circuit 140 applies motion compensation based on the motion vector sent from the motion detection circuit 131 to the locally decoded image sent from the calculator 139, and sends an image obtained after the motion compensation to the calculators 132 and 139 as a reference image.

Figure 13:
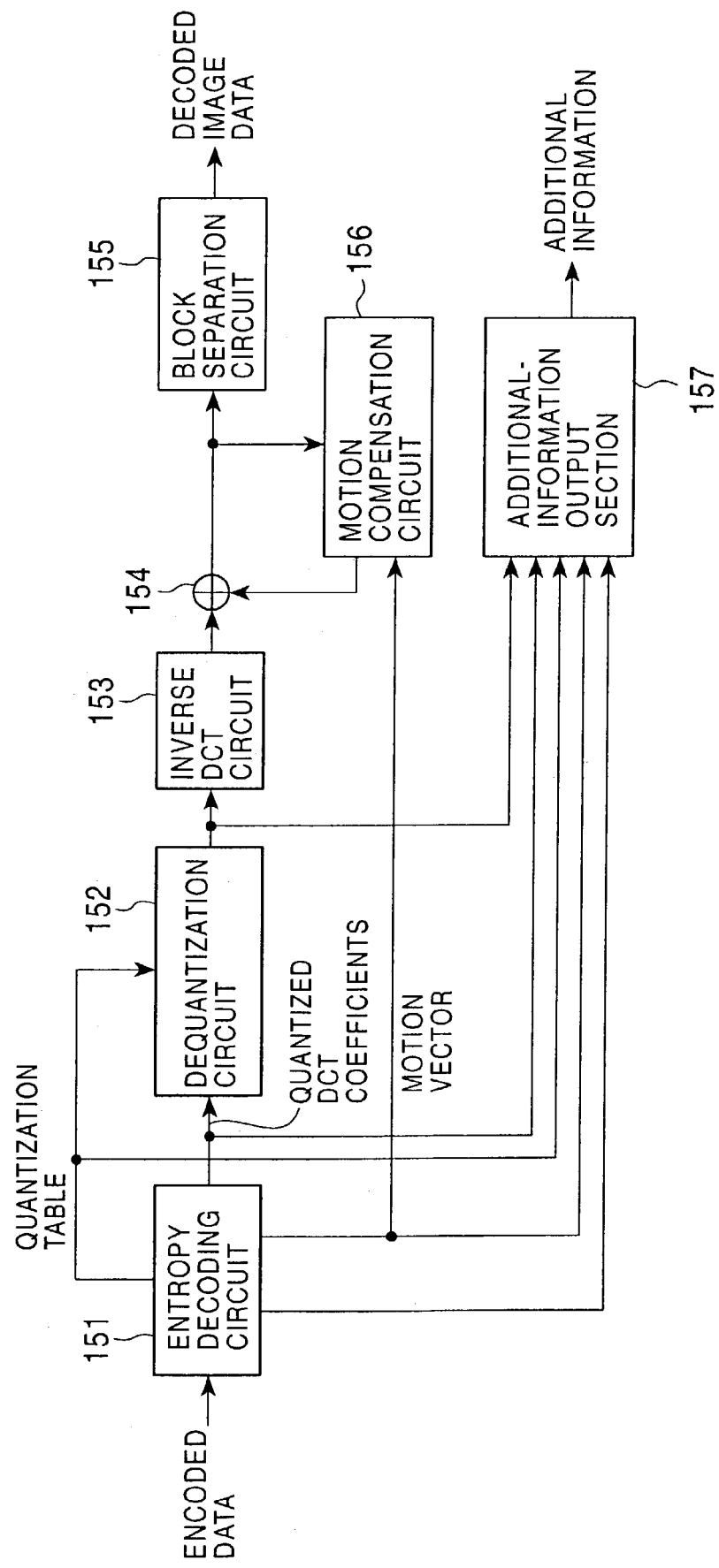
FIG. 13 is a block diagram showing a third example structure of the decoding sections 21, 23, 54, and 56.

Next, FIG. 13 shows an example structure of the decoding section 21 shown in FIG. 2 used when the encoder 1 shown in FIG. 1 is configured as shown in FIG. 12. When the decoding section 21 is configured as shown in FIG. 13, the decoding section 23 shown in FIG. 2 and the decoding sections 54 and 56 shown in FIG. 6 are also configured in the same way as shown in FIG. 13.

The encoded data is sent to an entropy decoding circuit 151. The entropy decoding circuit 151 applies entropy decoding to the encoded data to obtain quantized DCT coefficients, and separates a motion vector, a quantization table, other necessary information from the encoded data. The quantized DCT coefficients and the quantization table are sent to a dequantization circuit 152, and the motion vector is sent to a motion compensation circuit 156.

The dequantization circuit 152 dequantizes the quantized DCT coefficients sent from the entropy decoding circuit 151 according to the quantization table also sent from the entropy decoding circuit 11 to obtain DCT coefficients, and sends them to an inverse DCT circuit 153. The inverse DCT circuit 153 applies inverse DCT processing to the DCT coefficients sent from the dequantization circuit 152, and outputs to a calculator 154. The calculator 154 receives an I picture or a P picture which has been already decoded, to which motion compensation is applied according to the motion vector sent from the entropy decoding circuit 151 and which is output from the motion compensation circuit 156 as a reference image, in addition to the output of the dequantization circuit 153. When the output of the inverse DCT circuit 153 is for a P picture or a B picture, the calculator 154 adds the output to the output of the motion compensation circuit 156 to generate the original image by decoding, and sends to a block separation circuit 155. When the output of the inverse DCT circuit 153 is for an I picture, since the output is an decoded image of the I picture, the calculator 154 sends it as is to the block separation section 155.

The block separation circuit 155 unblocks the decoded image sent from the calculator 154 in units of pixel blocks to obtain decoded image data, and outputs it.

The motion compensation circuit 156 receives the I picture and the P picture among the decoded images output from the calculator 154, and applies motion compensation based on the motion vector sent from the entropy decoding circuit 151. Then, the motion compensation circuit 156 sends an image obtained after the motion compensation to the calculator 154 as a reference image.

An additional-information output section 157 acquires informant obtained in a process of decoding the encoded data to generate decoded image data, as described above, and outputs a part or the whole of the information as additional information.

More specifically, the additional-information output section 157 receives the quantization table, the quantized DCT coefficients, and the motion vector output from the entropy decoding circuit 151, and the DCT coefficients output from the dequantization circuit 122. In addition, the additional-information output section 157 also receives information (such as a picture type, block positional information, a frame DCT mode/a field DCT mode) disposed in each layer of an MPEG stream obtained when the entropy decoding circuit 151 applies entropy decoding to the encoded data. The additional-information output section 157 outputs a part or the whole of these pieces of information as additional information.

Next, the above-described series of processing can be implemented not only by hardware but also by software. When the series of processing is achieved by software, a program constituting the software is installed into a general-purpose computer or others.

Figure 14:
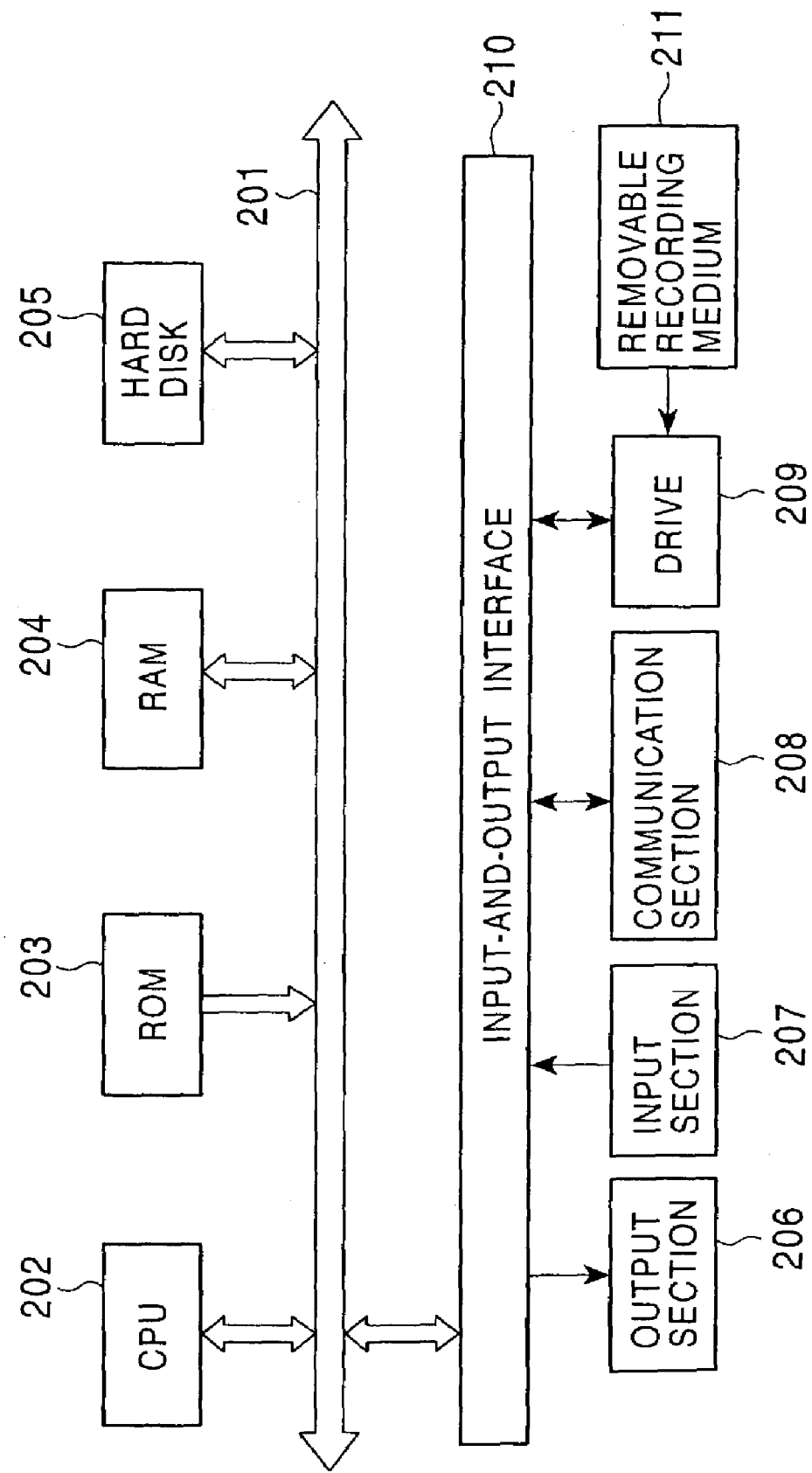
FIG. 14 is a block diagram showing an example structure of a computer according to an embodiment of the present invention.

FIG. 14 shows an example structure of a computer into which a program executing the above-described series of processing is installed, according to an embodiment.

The program can be recorded in advance into a hard disk 205 or a ROM 203 serving as a recording medium which is built in the computer.

Alternatively, the program can be stored (recorded) temporarily or perpetually in removable recording media 211, such as a floppy disk, a CD-ROM (compact disc read-only memory), a DVD (digital versatile disk), a magnetic disk, and a semiconductor memory. Such removable recording media 211 can be provided as so-called package software.

The program can be installed into the computer from removable recording media 211 such as those described above. In addition, the program can be transferred by radio from a downloading site to the computer through an artificial satellite for digital satellite broadcasting, or to the computer by wire through a network such as the Internet; and the computer can receive the program transferred in such a way by a communication section 208, and install into the hard disk 205, built in the computer.

The computer includes a CPU (central processing unit) 202. The CPU 202 is connected to an input and output interface 210 through a bus 201. When the user operates an input section 207 formed of a keyboard, a mouse, a microphone, and others to input a command through the input and output interface 210, the CPU 202 executes a program stored in the ROM (read-only memory) 203. Alternatively, the CPU 202 loads into a RAM (random access memory) 204 a program stored in the hard disk 205; a program transferred through the satellite or the network, received by the communication section 208, and installed into the hard disk 205; or a program read from a removable recording medium 211 mounted to a drive 209, and installed into the hard disk 205; and executes it. With this operation, the CPU 202 performs processing based on the above-described flowchart, or processing executed by the structure shown in the above-described block diagram. Then, for example, the CPU 202 outputs the processing result through the input and output interface 210 to a display section 206 formed of an LCD (liquid-crystal display), a speaker, and others; transmits from the communication section 208; or records in the hard disk 205, as required.

In the present specification, the processing steps describing the programs for executing various types of processing are not necessarily processed in a time sequential manner in the order in which the steps are described in the flowcharts. Processing to be executed in parallel or individually (such as parallel processing or processing by objects) is also included.

Further, the programs may be processed by one computer or by a plurality of computers in a distributed-processing manner. In addition, the programs may be transferred to and executed by a remote computer.

The present invention can be applied without using a specific encoding/decoding method. More specifically, in the present embodiment, the CELP method, the JPEG method, and the MPEG2 method have been described. The present invention can also be applied to various types of encoding/decoding methods, such as the M-JPEG (motion JPEG) method, the MPEG1 method, the MPEG4 method, the MP3 (MPEG-1 Audio Layer 3) method, and the ATRAC (adaptive transform acoustic coding) method.

In the present embodiment, encoded data is decoded by a decoding method corresponding to the encoding method. The encoded data can be decoded by class-classification adaptive processing. In class-classification adaptive processing, the encoded data can be decoded by using tap coefficients obtained by performing learning in which data to be encoded is set to master data and encoded data obtained by encoding the data is set to apprentice data.

Further, in the present embodiment, a prediction value for high-quality data is obtained by the linear prediction calculation using the tap coefficients. The prediction value can also be obtained by a higher-order, second-order or more, prediction calculation.

Further, in the present embodiment, the class-classification adaptive processing circuit 24 in the decoder 2 stores in advance tap coefficients used for improving quality. The tap coefficients can be included in encoded data and provided for the decoder 2.

Furthermore, in the present embodiment, a prediction tap is generated from the first additional information and the second additional information in addition to the first decoded data and the second decoded data. The prediction tap can also be generated, for example, only from the first decoded data and the second decoded data. The same applies to a class tap.

INDUSTRIAL APPLICABILITY

According to the first data processing apparatus, the first data processing method, the first program, and the first recording medium according to the present invention, encoded data is decoded, and decoded data obtained as a result is encoded to output re-encoded data. A prediction tap used for a predetermined prediction calculation with tap coefficients obtained by learning is generated from the decoded data and information obtained from the re-encoded data. The prediction tap and the tap coefficients are used to perform the predetermined prediction calculation to obtain a prediction value corresponding to master data used as a master in the learning. Therefore, for example, data having sufficiently improved quality can be obtained.

According to the second data processing apparatus, the second data processing method, the second program, and the second recording medium according to the present invention, decoded data obtained by encoding master data and decoding it, and information obtained from re-encoded data obtained by encoding the decoded data are generated from the master data serving as a master, as apprentice data serving as an apprentice. Then, a prediction tap used for predicting the master data is generated from the apprentice data, and learning is performed such that the prediction error of a prediction value for the master data, obtained by performing a predetermined prediction calculation by using the prediction tap and tap coefficients to obtain the tap coefficients. Therefore, for example, data having sufficiently improved quality can be obtained by performing a prediction calculation with the use of the tap coefficients.

According to the third data processing apparatus, the third data processing method, the third program, and the third recording medium according to the present invention, encoded data obtained by encoding data is decoded, and decoded data obtained as a result is encoded to output re-encoded data. Then, a class tap used for class classification is generated from the decoded data and information obtained from the re-encoded data. Class classification is performed according to the class tap. Therefore, data can be appropriately classified into classes.

The invention claimed is:

1. A data processing apparatus for processing encoded data obtained by encoding data, characterized by comprising:
   decoding means for decoding the encoded data and for outputting decoded data;
   re-encoding means for encoding the decoded data and for outputting re-encoded data;
   prediction-tap generation means for generating a prediction tap used for a predetermined prediction calculation with tap coefficients obtained by learning, from the decoded data and information obtained from the re-encoded data;
   tap-coefficient acquisition means for acquiring the tap coefficients; and
   prediction means for obtaining a prediction value corresponding to master data used as a master in the learning, by the predetermined prediction calculation with the use of the prediction tap and the tap coefficients.

2. A data processing apparatus according to claim 1, characterized in that the prediction means obtains the prediction value by a linear prediction calculation with the use of the prediction tap and the tap coefficients.

3. A data processing apparatus according to claim 1, characterized in that the decoding means outputs information obtained in a process of decoding the encoded data, as additional information, and
   the prediction-tap generation means generates the prediction tap by also using the additional information.

4. A data processing apparatus according to claim 1, characterized by further comprising re-decoding means for decoding the re-encoded data and for outputting re-decoded data, and characterized in that
   the prediction-tap generation means generates the prediction tap from the decoded data and the re-decoded data.

5. A data processing apparatus according to claim 4, characterized in that the re-decoding means outputs information obtained in a process of decoding the re-encoded data, as additional information, and
   the prediction-tap generation means generates the prediction tap by also using the additional information.

6. A data processing apparatus according to claim 1, characterized by further comprising:
   class-tap generation means for generating a class tap used for class classification for classifying information, from the decoded data and information obtained from the re-encoded data; and
   class classification means for performing class classification according to the class tap, and characterized in that
   the tap-coefficient acquisition means acquires the tap coefficients corresponding to a class output from the class classification means, and
   the prediction means obtains the prediction value by using the tap coefficients corresponding to the class output from the class classification means.

7. A data processing apparatus according to claim 6, characterized in that the decoding means outputs information obtained in a process of decoding the encoded data, as additional information, and
   the class-tap generation means generates the class tap by also using the additional information.

8. data processing apparatus according to claim 6, characterized by further comprising re-decoding means for decoding the re-encoded data and for outputting re-decoded data, and characterized in that
   the class-tap generation means generates the class tap from the decoded data and the re-decoded data.

9. data processing apparatus according to claim 8, characterized in that the re-decoding means outputs information obtained in a process of decoding the re-encoded data, as additional information, and
   the class-tap generation means generates the class tap by also using the additional information.

10. A data processing apparatus according to claim 1, characterized in that he data is image data.

11. A data processing apparatus according to claim 10, characterized in that the encoded data includes data obtained by at least orthogonally transforming the image data.

12. A data processing apparatus according to claim 1, characterized in that to data is audio data.

13. A data processing apparatus according to claim 12, characterized in that the encoded data includes at least a code corresponding to linear prediction coefficients and to a remainder signal.

14. A data processing method for processing encoded data obtained by encoding data, characterized by comprising:
   a decoding step of decoding the encoded data and of outputting decoded data;
   a re-encoding step of encoding the decoded data and of outputting re-encoded data;
   a prediction-tap generation step of generating a prediction tap used for a predetermined prediction calculation with tap coefficients obtained by learning, from the decoded data and information obtained from the re-encoded data;
   a tap-coefficient acquisition step of acquiring the tap coefficients; and a prediction step of obtaining a prediction value corresponding to master data used as a master in the learning, by the predetermined prediction calculation with the use of the prediction tap and the tap coefficients.

15. A computer program embodied in a computer readable medium for performing the steps of:
    decoding the encoded data and of outputting decoded data;
    encoding the decoded data and of outputting re-encoded data;
    generating a prediction tap used for a predeterminied prediction calculation with tap coefficients obtained by learning, from the decoded data and information obtained from the re-encoded data;
    acquiring the tap coefficients; and
    obtaining a prediction value corresponding to master data used as a master in the learning, by the predetermined prediction calculation with the use of the prediction tap and the tap coefficients.

16. A recording medium storing a program which makes a computer process encoded data obtained by encoding data, characterized by recording the program comprising:
    a decoding step of decoding the encoded data and of outputting decoded data;
    a re-encoding step of encoding the decoded data and of outputting re-encoded data;
    a prediction-tap generation step of generating a prediction tap used for a predetermined prediction calculation with tap coefficients obtained by learning, from the decoded data and information obtained from the re-encoded data;
    a tap-coefficient acquisition step of acquiring the tap coefficients; and
    a prediction step of obtaining a prediction value corresponding to master data used as a master in the learning, by the predetermined prediction calculation with the use of the prediction tap and the tap coefficients.

17. A data processing apparatus for learning predetermined tap coefficients used for processing encoded data obtained by encoding data, characterized by comprising:
    apprentice-data generation means for generating from master data serving as a master, decoded data obtained by encoding the master data and then decoding it, and information obtained from re-encoded data obtained by encoding the decoded data, as apprentice data serving as an apprentice;
    prediction-tap generation means for generating a prediction tap used for predicting the master data, from the apprentice data; and
    learning means for performing learning such that the prediction error of a prediction value for the master data, obtained by performing a predetennined prediction calculation by using the prediction tap and tap coefficients, is statistically minimum, and for obtaining the tap coefficients.

18. A data processing apparatus according to claim 17, characterized in that the learning means performs learning such that the prediction error of a prediction value for the master data, obtained by a linear prediction calculation by using the prediction tap and the tap coefficients, is statistically minimum.

19. A data processing apparatus according to claim 17, characterized in that the apprentice-data generation mews outputs also information obtained in a process of decoding encoded data obtained by encoding the master data, as the apprentice data.

20. A data processing apparatus according to claim 17, characterized in that the apprentice-data generation means outputs re-decoded data obtained as a result when the re-encoded data is decoded, as the apprentice data.

21. A data processing apparatus according to claim 20, characterized in that the apprentice-data generation means outputs also information obtained in a process of decoding the re-encoded data, as the apprentice data.

22. A data processing apparatus according to claim 17, characterized by further comprising:
    class-tap generation means for generating a class tap used for perfonning class classification which classifies information, from the apprentice data; and
    class classification means for performing class classification according to the class tap, and characterized in that the learning means obtains the tap coefficients for each class output from the class classification means.

23. A data processing apparatus according to claim 22, characterized in that the apprentice-data generation means outputs also information obtained in a process of decoding encoded data obtained by encoding the master data, as the apprentice data.

24. A data processing apparatus according to claim 22, characterized in that the apprentice-data generation means outputs re-decoded data obtained as a result when the re-encoded data is decoded, as the apprentice data.

25. A data processing apparatus according to claim 24, characterized in that the apprentice-data generation means outputs also information obtained in a process of decoding the re-encoded data, as the apprentice data.

26. A data processing apparatus according to claim 17, characterized in that the master data is image data.

27. A data processing apparatus according to claim 26, characterized in that the apprentice-data generation means encodes the image data at least by orthogonal transform.

28. A data processing apparatus according to claim 17, characterized in that the data is audio data.

29. A data processing apparatus according to claim 28, characterized in that
    the apprentice-data generation means encodes the audio data to generate at least a code corresponding to linear prediction coefficients and to a remainder signal.

30. A data processing method for learning predetermined tap coefficients used for processing encoded data obtained by encoding data, characterized by comprising:
    an apprentice-data generation step of generating from master data serving as a master, decoded data obtained by encoding the master data and then decoding it, and information obtained from re-encoded data obtained by encoding the decoded data, as apprentice data serving as an apprentice;
    a prediction-tap generation step of generating a prediction tap used for predicting the master data, from the apprentice data; and
    a learning step of perfonning learning such that the prediction error of a prediction value for the master data, obtained by a predetermined prediction calculation by using the prediction tap and tap coefficients, is statistically minimum, and of obtaining the tap coefficients.

31. A computer program embodied in a computer readable medium for making a computer execute data processing for learning predetermined tap coefficients used for processing encoded data obtained by encoding data, the program performing the steps of:
    generating from master data serving as a master, decoded data obtained by encoding the master data and then decoding it, and information obtained from re-encoded data obtained by encoding the decoded data, as apprentice data serving as an apprentice;

generating a prediction tap used for predicting the master data, from the apprentice data; and performing learning such that the prediction error of a prediction value for the master data, obtained by a predetermined prediction calculation by using the prediction tap and tap coefficients, is statistically minimum, and of obtaining the tap coefficients.

32. A recording medium storing a program which makes a computer execute data processing for learning predetermined tap coefficients used for processing encoded data obtained by encoding data, characterized by recording the program comprising:

an apprentice-data generation step of generating from master data serving as a master, decoded data obtained by encoding the master data and then decoding it, and information obtained from re-encoded data obtained by encoding the decoded data, as apprentice data serving as an apprentice;

a prediction-tap generation step of generating a prediction tap used for predicting the master data, from the apprentice data; and a learning step of performing learning such that the prediction error of a prediction value for the master data, obtained by a predetermined prediction calculation, by using the prediction tap and tap coefficients, is statistically minimum, and of obtaining the tap coefficients.

33. A data processing apparatus for performing class classification which classifies information, characterized by comprising:

decoding means for decoding encoded data obtained by encoding data and for outputting decoded data;

re-encoding means for encoding the decoded data and for outputting re-encoded data;

class-tap generation means for generating a class tap used for the class classification, from the decoded data and information obtained from the re-encoded data; and class classification means for performing class classification according to the class tap.

34. A data processing apparatus according to claim 33, characterized in that the decoding means outputs information obtained in a process of decoding the encoded data, as additional information, and the class-tap generation means generates the class tap by also using the additional information.

35. A data processing apparatus according to claim 33, characterized by further comprising re-decoding means for decoding the re-encoded data and for outputting re-decoded data, and characterized in that the class-tap generation means generates the class tap from the decoded data and the re-decoded data.

36. A data processing apparatus according to claim 35, characterized in that the re-decoding means outputs information obtained in a process of decoding the re-encoded data, as additional information, and the prediction-tap generation means generates the prediction tap by also using the additional information.

37. A data processing apparatus according to claim 33, characterized in that the data is image data.

38. A data processing apparatus according to claim 37, characterized in that the encoded data includes data obtained by at least orthogonally transforming the image data.

39. A data processing apparatus according to claim 33, characterized in that the data is audio data.

40. A data processing apparatus according to claim 39, characterized in that the encoded data includes at least a code corresponding to linear prediction coefficients and to a remainder signal.

41. A data processing method for performing class classification which classifies information, characterized by comprising:

a decoding step of decoding encoded data obtained by encoding data and for outputting decoded data;

a re-encoding step of encoding the decoded data and for outputting re-encoded data;

a class-tap generation step of generating a class tap used for the class classification, from the decoded data and information obtained from the re-encoded data; and a class classification step of performing class classification according to the class tap.

42. A computer program embodied in a computer readable medium for making a computer execute data processing for performing class classification which classifies information, said program performing the steps of:

decoding encoded data obtained by encoding data and for outputting decoded data;

encoding the decoded data and for outputting re-encoded data;

generating a class tap used for the class classification, from the decoded data and information obtained from the re-encoded data; and performing class classification according to the class tap.

43. A recording medium storing a program which makes a computer execute data processing for performing class classification which classifies information, characterized by recording the program comprising:

a decoding step of decoding encoded data obtained by encoding data and for outputting decoded data;

a re-encoding step of encoding the decoded data and for outputting re-encoded data;

a class-tap generation step of generating a class tap used for the class classification, from the decoded data and information obtained from the re-encoded data; and a class classification step of performing class classification according to the class tap.

* * * * *